United States Patent
Yamauchi et al.

(10) Patent No.: US 9,223,235 B2
(45) Date of Patent: Dec. 29, 2015

(54) FINE PARTICLES, PARTICLE GROUP, ANTI-COUNTERFEITING INK, ANTI-COUNTERFEITING TONER, ANTI-COUNTERFEITING SHEET, AND ANTI-COUNTERFEITING MEDIUM

(75) Inventors: Tsuyoshi Yamauchi, Tokyo-to (JP); Mitsuru Kitamura, Tokyo-to (JP); Manabu Yamamoto, Tokyo-to (JP); Akiko Kitamura, Tokyo-to (JP); Yoko Sekine, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 85 days.

(21) Appl. No.: 14/111,446

(22) PCT Filed: Apr. 11, 2012

(86) PCT No.: PCT/JP2012/059895
§ 371 (c)(1),
(2), (4) Date: Oct. 11, 2013

(87) PCT Pub. No.: WO2012/141211
PCT Pub. Date: Oct. 18, 2012

(65) Prior Publication Data
US 2014/0028011 A1    Jan. 30, 2014

(30) Foreign Application Priority Data
Apr. 12, 2011   (JP) .................................. 2011-088289

(51) Int. Cl.
*B42D 15/00* (2006.01)
*G03G 9/08* (2006.01)
(Continued)

(52) U.S. Cl.
CPC ............... *G03G 9/0802* (2013.01); *B41M 3/14* (2013.01); *B42D 25/00* (2014.10); *B42D 25/29* (2014.10);
(Continued)

(58) Field of Classification Search
CPC .................................................... B42D 15/0013
USPC .............. 235/491, 494, 487, 488; 283/74, 67; 428/195.1
See application file for complete search history.

(56) References Cited

U.S. PATENT DOCUMENTS 4,053,433 A * 10/1977 Lee ............................ 252/408.1
2005/0277710 A1* 12/2005 Joyce et al. ................... 523/210
(Continued)

FOREIGN PATENT DOCUMENTS

JP    10-320517 A    12/1998
JP    2001-288698 A    10/2001
(Continued)

OTHER PUBLICATIONS

Extended European Search Report Appln. No. 12771357.6; Issued Aug. 22, 2014.

*Primary Examiner* — Allyson Trail
(74) *Attorney, Agent, or Firm* — Ladas & Parry LLP

(57) ABSTRACT

A main object of the present invention is to provide fine particles, a particle group, an anti-counterfeiting ink, an anti-counterfeiting toner, an anti-counterfeiting sheet, and an anti-counterfeiting medium enabling to achieve a high level of authentication. The object of the present invention is achieved by providing the fine particle comprising an identification information group including multiple types of identification information identifiable by magnification, characterized in that the identification information group includes first identification information and second identification information which cannot be identified at any magnifying power capable of identifying the first identification information.

18 Claims, 15 Drawing Sheets

(51) Int. Cl.
*B41M 3/14* (2006.01)
*G02B 5/32* (2006.01)
*G03G 21/04* (2006.01)
*C09D 11/03* (2014.01)
*C09D 11/50* (2014.01)
*B42D 25/29* (2014.01)
*B42D 25/00* (2014.01)
*B42D 25/324* (2014.01)
*B42D 25/328* (2014.01)

(52) U.S. Cl.
CPC ............... *C09D 11/03* (2013.01); *C09D 11/50* (2013.01); *G02B 5/32* (2013.01); *G03G 9/08* (2013.01); *G03G 21/04* (2013.01); *B42D 25/324* (2014.10); *B42D 25/328* (2014.10); *B42D 2033/20* (2013.01); *B42D 2033/24* (2013.01); *B42D 2035/30* (2013.01)

(56) References Cited

U.S. PATENT DOCUMENTS

| | | |
|---|---|---|
| 2007/0012784 A1* | 1/2007 | Mercolino .................... 235/491 |
| 2007/0243234 A1 | 10/2007 | Gabriele et al. |
| 2011/0031735 A1 | 2/2011 | Gerigk et al. |
| 2011/0250410 A1* | 10/2011 | Rygas et al. ............... 428/195.1 |
| 2013/0260301 A1* | 10/2013 | Yamauchi et al. ............ 430/105 |

FOREIGN PATENT DOCUMENTS

| | | |
|---|---|---|
| JP | 2002-230512 A | 8/2002 |
| JP | 2005-119097 A | 5/2005 |
| JP | 2008-528443 A | 7/2008 |
| JP | 2008-230228 A | 10/2008 |
| JP | 2009-193069 A | 8/2009 |
| JP | 2011-511322 A | 4/2011 |
| WO | 2005017048 A2 | 2/2005 |
| WO | 2009139396 A1 | 11/2009 |

* cited by examiner

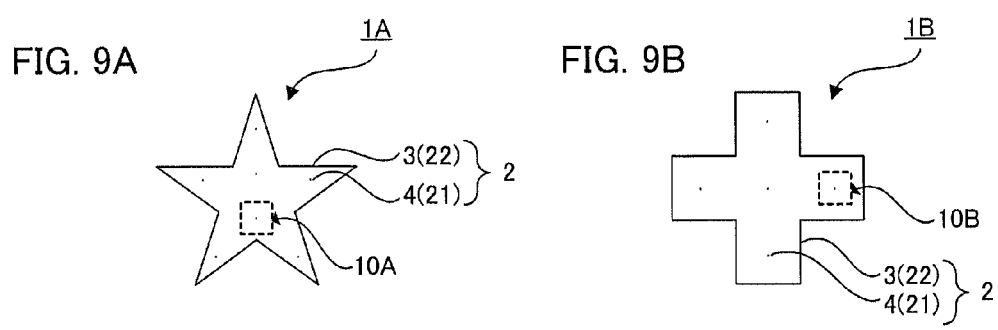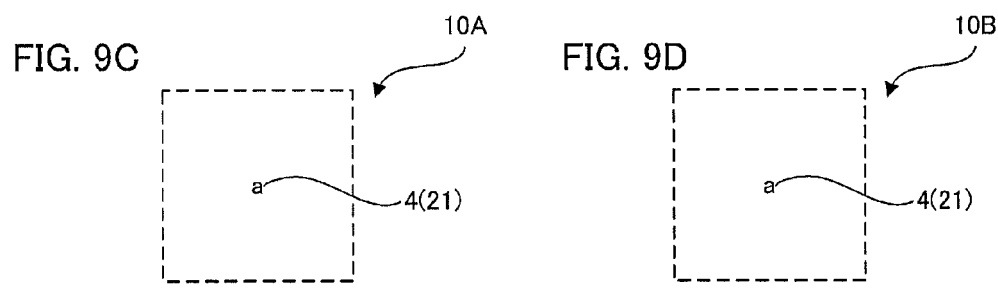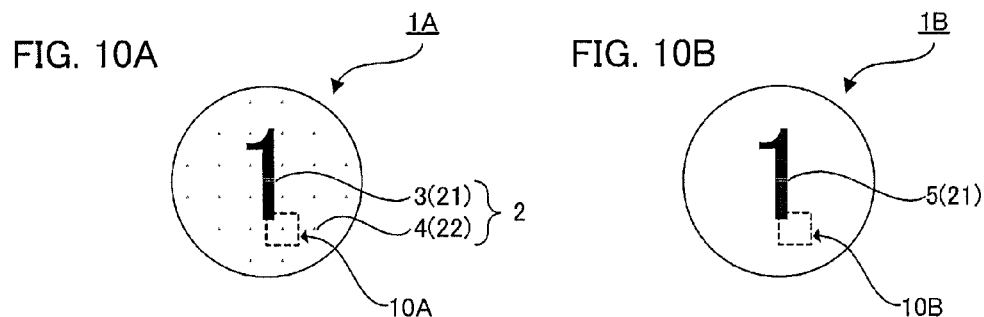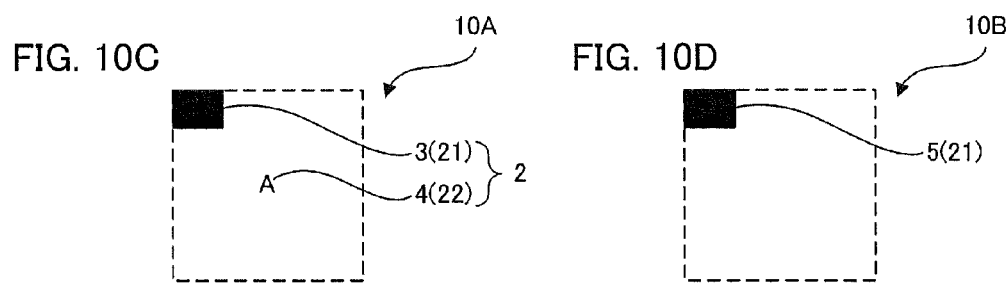

FINE PARTICLES, PARTICLE GROUP, ANTI-COUNTERFEITING INK, ANTI-COUNTERFEITING TONER, ANTI-COUNTERFEITING SHEET, AND ANTI-COUNTERFEITING MEDIUM

TECHNICAL FIELD

The present invention relates to anti-counterfeiting technology for performing multi-step authentication using multiple types of identification information identifiable by magnification.

BACKGROUND ART

Anti-counterfeit technologies known include holograms, watermarks, a latent image pattern, pearl ink, luminescent ink, intaglio printing, and micro-characters. Among them, since imitation and copy are unlikely to occur when application of anti-counterfeiting technology is not easily verified, attention has been paid to anti-counterfeiting technology utilizing information which cannot be visually (in naked eye) verified. However, in recent years printing technology has been developed enabling to print a high-resolution image so that even when the location of information which cannot be visually verified is specified, there is a problem that imitation or copy is likely to occur.

Therefore, anti-counterfeit technology using fine particles has been proposed. The fine particles are referred to as a tracking taggant (tracking additive). Fine particles having information identifiable by magnification are known, and for example, fine particles having symbols such as letters, numerals, signs, and marks and special shapes and fine particles in which multilayers of colored thin films are laminated were proposed (For example, see Patent Literatures No. 1 to 4.) In fine particles having symbols or special shapes, authenticity can be judged by magnifying the symbol or special shape for identification. In fine particles in which multilayers of colored thin films are laminated, authenticity can be judged by magnifying the color pattern of multilayered films for identification. In such anti-counterfeiting technology using fine particles, verification of fine particles themselves is difficult making imitation and copy difficult, thereby expressing excellent anti-counterfeiting effects.

CITATION LIST

Patent Literatures

Patent Literature 1: Japanese Patent No. 3665282
Patent Literature 2: Japanese Patent Application Laid-Open (JP-A) No. 2008-230228
Patent Literature 3: JP-A No. 2009-193069
Patent Literature 4: JP-A No. 2001-288698

SUMMARY OF INVENTION

Technical Problem

Anti-counterfeiting technology requires two aspects for its application. One aspect is ease for authentication of genuine products and the other is the ability to perform a high level of authentication when it is required to distinguish authentic products from counterfeit products such as sophisticated imitation products and copy products.

Conventional anti-counterfeiting technology using fine particles identifies only the presence or absence of specific fine particles, thereby increasing a risk of imitation or copy when the presence of fine particles is found.

The present invention has been made in view of the above problem and its main object is to provide fine particles, a particle group, an anti-counterfeiting ink, an anti-counterfeiting toner, an anti-counterfeiting sheet, and an anti-counterfeiting medium enabling to achieve a high level of authentication.

Solution to Problem

In order to achieve the above object, the present invention provides a fine particle comprising an identification information group including multiple types of identification information identifiable by magnification, characterized in that the identification information group includes first identification information and second identification information which cannot be identified at any magnifying power capable of identifying the first identification information.

In the present invention, since the identification information group includes the first identification information and second identification information, multi-step authentication, first step authentication for verifying the first identification information and second step authentication for verifying the second identification information can be performed, thereby enabling to achieve a high level of authentication. Also, since the second identification information cannot be identified at any magnifying power capable of identifying the first identification information, it becomes difficult to learn the presence and detail of the second identification information, and since the authentication level of the second identification information becomes higher than that of first identification information, excellent anti-counterfeiting effects can be obtained.

Also, in the present invention, since the first identification information and second identification information can be identified by magnification, judgment of authenticity can be easily performed.

Further, since fine particles of the present invention have not only the first identification information but also the second identification information which cannot be identified by magnification at any power capable of identifying the first identification information, manufacture of fine particles is complex making imitation and copy difficult, thereby enabling to achieve a high level of anti-counterfeiting effects as well as a deterrent effect.

In the invention, the size of the second identification information is preferably $1/10$ or less relative to the size of the first identification information. This makes it more difficult to learn the presence and detail of the second identification information, thereby increasing the anti-counterfeiting effects.

Also, the present invention provides a particle group containing multiple fine particles comprising identification information identifiable by magnification, characterized in that the particle group has common identification information common in all of the fine particles contained in the particle group and non-common identification information different between one fine particle and other fine particle contained in the particle group; at least parts of the fine particles are fine particles comprising an identification information group including multiple types of identification information identifiable by magnification; the identification information group includes first identification information and second identification information which cannot be identified at any magnifying power capable of identifying the first identification information; and among the first identification information and second identification information, one information is used as the common identification information and the other as the non-common identification information.

Since the particle group of the present invention has common identification information and non-common identification information, multi-step authentication, authentication of common identification information and non-common identification information can be performed for a higher level of authentication of multiple fine particles. Also, the second identification information cannot be identified at any magnifying power capable of identifying the first identification information, making it difficult to learn the presence and detail of the second identification information, thereby making authentication level of the second identification information higher than that of the first identification information. Further, since the non-common identification information is information different between one fine particle and other fine particle, increasing the authentication level of non-common identification information. Since among the first identification information and second identification information, one information is used as the common identification information and the other as the non-common identification information, excellent anti-counterfeiting effects can be obtained.

Also, in the present invention, since the first identification information and second identification information can be identified by magnification, judgment of authenticity can be easily performed.

Further, in the present invention, since the fine particles have not only the first identification information but also the second identification information which cannot be identified at any magnifying power capable of identifying the first identification information, manufacture of the fine particles is complex making imitation and copy difficult, thereby achieving a higher level of the anti-counterfeiting effects as well as a deterrent effect.

In the invention, the size of second identification information is preferably 1/10 or less relative to the size of first identification information. This makes it more difficult to learn the presence and detail of second identification information, thereby increasing the anti-counterfeiting effects.

Also, the present invention provides anti-counterfeiting inks and anti-counterfeiting toners characterized in that the fine particle described above or the particle group described above is contained.

According to the present invention, the use of the fine particles described above or the particle group described above allows installation of multiple authentication steps for judging authenticity, thereby enabling to achieve a high level of authentication. Also, when the anti-counterfeiting ink or the anti-counterfeiting toner of the present invention are applied to an anti-counterfeiting medium, application of the anti-counterfeiting ink of the present invention to a supporting body or transfer of the anti-counterfeiting toner of the present invention onto the supporting body can easily fix fine particles to the supporting body so that various supports can be used, thereby generating an advantage of more options in the shape of the supporting body and the like.

Further, the present invention provides an anti-counterfeiting sheet comprising a fine particle containing layer in which the fine particles described above or the particle group described above is dispersed in a transparent resin.

According to the present invention, the use of the fine particles described above or the particle group described above allows installation of multiple authentication steps for judging authenticity, thereby enabling to achieve a high level of authentication. Also, since the number and the location of the fine particles in the anti-counterfeiting sheet of the present invention are determined in advance to apply to the anti-counterfeiting medium, excellent anti-counterfeiting effects can be obtained.

Further, the present invention provides an anti-counterfeiting sheet comprising a base part and an identification part formed on the surface of the base part and having a concave and convex shape provided with at least either one of the concave portion or the convex portion having an identification information group including multiple types of identification information identifiable by magnification, characterized in that the identification information group includes first identification information and second identification information which cannot be identified at any magnifying power capable of identifying the first identification information.

In the present invention, since the identification information group having a convex portion or a concave portion includes the first identification information and second identification information, multi-step authentication, first step authentication for verifying the first identification information and second step authentication for verifying the second identification information can be performed enabling to achieve a high level of authentication. Also, the second identification information cannot be identified at magnifying power capable of identifying the first identification information making it difficult to learn the presence and the detail of the second identification information, thereby making the authentication level of the second identification information higher than that of the first identification information so that excellent anti-counterfeiting effects can be obtained.

In the present invention, since the first identification information and second identification information can be identified by magnification, authenticity can be easily judged.

Further in the present invention, since the convex portion or the concave portion has not only the first identification information but also the second identification information which cannot be identified at any magnifying power capable of identifying the first identification information, formation of the convex portion or the concave portion is complex making imitation and copy difficult, thereby enabling to achieve a high level of the anti-counterfeiting effects as well as a deterrent effect.

Also, the present invention provides an anti-counterfeiting sheet comprising a base part and an identification part formed on the surface of the base part and having multiple convex and concave shapes provided with at least either one of the convex portion or the concave portion having identification information identifiable by magnification, characterized in that the identification part has common identification information common in the convex portion or the concave portion in all of the convex and concave shapes constituting the identification part and non-common identification information different between the convex portion or the concave portion in one convex and concave shape and the convex portion or the concave portion in other convex and concave shape constituting the identification part; at least parts of the convex and concave shapes are convex and concave shapes provided with at least either one of the convex portion or the concave portion having an identification information group including multiple types of identification information identifiable by magnification; the identification information group includes first identification information and second identification information which cannot be identified at any magnifying power capable of identifying the first identification information; and among the first identification information and the second identification information, one information is used as the common identification information and the other as the non-common identification information.

In the present invention, since the identification part has the common identification information and non-common identification information, multi-step authentication, authentication of the common identification information and authentication of the non-common identification information in the multiple convex and concave shapes can be performed for a high level of authentication. Also, the second identification information cannot be identified at any magnifying power capable of identifying the first identification information making it difficult to learn the presence and the detail of the second identification information, thereby making an authentication level of the second identification information higher than that of the first identification information. Further, the non-common identification information is information different between one convex and concave shape and other convex and concave shape, making the authentication level of non-common identification information higher. Since among the first identification information and second identification information, one information is used as the common identification information and the other as the non-common identification information, excellent anti-counterfeiting effects can be obtained.

In the present invention, since the first identification information and second identification information can be identified by magnification, authenticity can be easily judged.

Further, in the present invention, since the convex portion or the concave portion has not only the first identification information but also the second identification information which cannot be identified at any magnifying power capable of identifying the first identification information, formation of the convex portion or the concave portion is complex making imitation and copy difficult, thereby enabling to achieve a high level of the anti-counterfeiting effects as well as a deterrent effect.

In the invention, the size of the second identification information is preferably 1/10 or less relative to the size of the first identification information. This makes it more difficult to learn the presence and the detail of the second identification information, thereby increasing the anti-counterfeiting effects.

Further, the present invention provides an anti-counterfeiting medium comprising the fine particle described above, the particle group described above, or the anti-counterfeiting sheet described above.

In the present invention, since the fine particle, the particle group, or the anti-counterfeiting sheet is used; they are very useful for preventing counterfeit.

Advantageous Effects of Invention

In the present invention, since the first identification information and second identification information which cannot be identified at any magnifying power capable of identifying the first identification information are used, positive effects are achieved of which not only a high level of authentication can be obtained, but also a high level of the anti-counterfeiting effects and a deterrent effect can be obtained. In the present invention, since the first identification information and second identification information can be identified by magnification, positive effects are achieved of which authenticity can be easily judged.

BRIEF DESCRIPTION OF DRAWINGS

FIGS. 9A to 9D are schematic views and enlarged views illustrating another example of the particle group of the present invention.

FIGS. 10A to 10D are schematic views and enlarged views illustrating another example of the particle group of the present invention.

DESCRIPTION OF EMBODIMENTS

Hereinafter, a fine particle, a particle group, an anti-counterfeiting ink, an anti-counterfeiting toner, an anti-counterfeiting sheet, and an anti-counterfeiting medium of the present invention will be described in detail.

A. Fine Particle

Firstly, a fine particle of the present invention will be described.

The fine particle of the present invention is a fine particle comprising an identification information group including multiple types of identification information identifiable by magnification, characterized in that the identification information group includes first identification information and second identification information which cannot be identified at any magnifying power capable of identifying the first identification information.

The fine particles of the present invention will be described with reference to the drawings.

Figure 1A:
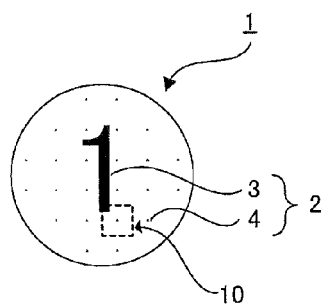
FIGS. 1A and 1B are a schematic view and an enlarged view illustrating an example of the fine particle of the present invention.
Figure 1B:
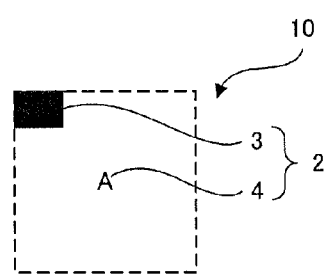

FIGS. 1A and 1B are schematic views illustrating an example of the fine particle of the present invention, and FIG. 1B is an enlarged view of a boxed area 10 illustrated with a dotted line in FIG. 1A. A fine particle 1 exemplified in FIGS. 1A and 1B has an identification information group 2 including first identification information 3 (numeral "1") and second identification information 4 (letter "A") identifiable by magnification. The second identification information 4 (letter "A") is smaller than the first identification information 3 (numeral "1") and cannot be identified at any magnifying power capable of identifying the first identification information 3 (numeral "1").

In judgment of authenticity using the fine particle 1 exemplified in FIGS. 1A and 1B, first step authentication is firstly performed by verifying the first identification information 3 (numeral "1") at low magnifying power and second step authentication is next performed by verifying the second identification information 4 ("letter A") at higher magnifying power. In this way, two-step authentication can be installed for judging authenticity. Also, since the second identification information 4 (letter "A") cannot be identified by magnification at any power capable of identifying the first identification information 3 (numeral "1"), the authentication level of the second identification information 4 (letter "A") is higher than that of the first identification information 3 (numeral "1").

Figure 2A:
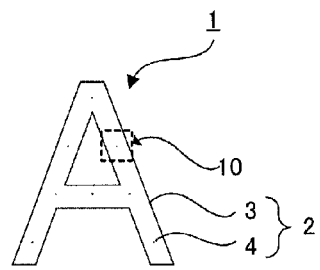
FIGS. 2A and 2B are a schematic view and an enlarged view illustrating another example of the fine particle of the present invention.
Figure 2B:
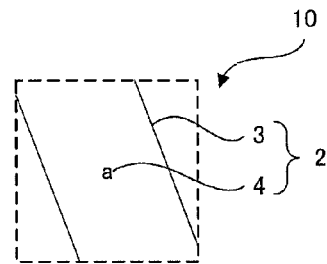

FIGS. 2A and 2B are schematic views illustrating another example of the fine particle of the present invention and FIG. 2B is an enlarged view of a boxed area 10 illustrated with a dotted line in FIG. 2A. A fine particle 1 exemplified in FIGS. 2A and 2B has an identification information group 2 including first identification information 3 (letter "A") and second identification information 4 (letter "a") identifiable by magnification. The second identification information 4 (letter "a") is smaller than the first identification information 3 (letter "A") and cannot be identified at any magnifying power capable of identifying the first identification information 3 (letter "A").

In judgment of authenticity using the fine particle 1 exemplified in FIGS. 2A and 2B, first step authentication is firstly performed by verifying the first identification information 3 (letter "A") at low magnifying power and second step authentication is next performed by verifying the second identification information 4 ("letter a") at higher magnifying power. In this way, two-step authentication can be installed for judging authenticity. Also, since the second identification information 4 (letter "a") cannot be identified at any magnifying power capable of identifying the first identification information 3 (letter "A"), the identification level of the second identification information 4 (letter "a") is higher than that of the first identification information 3 (letter "A").

In this way, in the present invention, since the identification information group includes the first identification information and second identification information, the multi-step authentication, the first step authentication for verifying the first identification information and the second step authentication for verifying the second identification information can be performed, thereby enabling to achieve a high level of authentication. Also, since the second identification information cannot be identified at any magnifying power capable of identifying the first identification information, it becomes difficult to learn the presence and the detail of the second identification information, and since the authentication level of the second identification information becomes higher than that of the first identification information, excellent anti-counterfeiting effects can be obtained.

Also, in the present invention, since the first identification information and second identification information can be identified by magnification, authenticity can be easily judged by magnifying the fine particles to verify the first identification information and second identification information. Further, since the second identification information cannot be identified at any magnifying power capable of identifying the first identification information, authenticity can be simply judged by magnifying the fine particles at any power capable of identifying the first identification information to verify only the first identification information.

Further, since the fine particles of the present invention have not only the first identification information but also the second identification information which cannot be identified at any magnifying power capable of identifying the first identification information, manufacture of the fine particles is complex making imitation and copy difficult, thereby enabling to achieve a high level of the anti-counterfeiting effects as well as a deterrent effect.

Incidentally, the term "second identification information cannot be identified at any magnifying power capable of identifying first identification information" means the concept including not only a case in which when a fine particle is magnified at any power capable of identifying the first identification information, the second identification is not learnt at all, but also a case in which some sorts of anti-counterfeiting measures are implemented for making the second identification information unidentifiable to some degree.

The term "identification information can be identified" means that identification information can be recognized. Also, the term "identification information cannot be identified" means that identification information cannot be recognized. The term "recognize" means that, for example, when identification information is a letter, the letter is recognized, whereas when identification information is arranged irregularly, its arrangement is measured for recognition.

Specifically, when the second identification information 4 is a letter "A" as illustrated in FIGS. 1A and 1B, identification information can be identified if the second identification information 4 is recognized as the letter "A" as illustrated in FIG. 1B. On one hand, when the second identification information is a letter "A" as illustrated in FIGS. 1A and 1B, identification information cannot be identified unless the second identification information 4 is recognized as the letter "A" as illustrated in FIG. 1A.

Also, while not illustrated, when the second identification information is arranged irregularly, identification information can be identified if its arrangement can be measured. On one hand, when the second identification information is arranged irregularly, identification information cannot be identified unless its arrangement is measured.

Also, for example, even when installation of some sort of anti-counterfeiting measures for the second identification information is found when magnifying the fine particle at any power capable of identifying the first identification information, the second identification information cannot be identified unless the second identification information is recognized.

Specifically, when the first identification information 3 is the numeral "1" and the second identification information 4 is the letter "A" as illustrated in FIGS. 1A and 1B, the second identification information 4 cannot be identified unless the second identification information 4 is recognized as the letter "A", even when finding some sort of identification information is provided as the second identification information 4 when magnifying the fine particle 1 at any magnifying power capable of identifying the first identification information 3 (numeral "1") as illustrated in FIG. 1A.

Hereinafter, each constitution in the fine particles of the present invention will be described.

1. Identification Information Group

An identification information group in the present invention is a group including multiple types of identification information identifiable by magnification, and includes first identification information and second identification information which cannot be identified at any magnifying power capable of identifying the first identification information.

Incidentally, the term "identifiable by magnification" means that identification is difficult by visual observation, but use of a magnifying means allows observation.

The magnifying means include, for example, a simple magnifying glass such as a loupe, a microscope, a display of an enlarged image captured by a CCD camera and processed with computer software.

The size of identification information is not particularly limited so far as its magnification allows the identification, and specifically, preferably 300 µm or less, more preferably 250 µm or less. When the size of identification information is too large, information is visually identified likely lowering anti-counterfeiting effects. Incidentally, when the size of identification information is small, judgment of authenticity by a simple magnifying instrument becomes difficult, but use of a high power magnifying instrument such as a microscope allows identification, and decrease of the size of identification information makes its manufacture difficult and increases the anti-counterfeiting effects. Therefore, a lower limit of the size of identification information is appropriately selected depending on the application of the fine particles of the present invention in such a case as confidentiality and fake difficulty are stressed as compared to ease in authentication.

The identification information group includes the first identification information and second identification information which cannot be identified at any magnifying power capable of identifying the first identification information. Hereinafter, the first identification information and second identification information will be described.

(1) First Identification Information

The first identification information in the present invention is one of identification information identifiable by magnification.

The size of the first identification information is not particularly limited so far as its magnification allows identification, and specifically, preferably 300 µm or less, and more preferably 250 µm or less. When the size of the first identification information is too large, information can be visually identified likely lowering the anti-counterfeiting effects. Also, the size of the first identification information is preferably identifiable using a simple magnifying instrument such as a loupe, and specifically, preferably 50 µm or more. Identification with a simple magnifying instrument allows easy judgment of authenticity. Incidentally, when the size of the first identification information is 50 µm or less, judgment of authenticity with a simple magnifying instrument becomes difficult, but use of a high power magnifying instrument such as a microscope allows identification, and decrease of the size of the first identification information makes its manufacture difficult and increases the anti-counterfeiting effects. Therefore, a lower limit of the size of the first identification information is appropriately selected depending on the application of the fine particles of the present invention in such a case as confidentiality and fake difficulty are stressed as compared to ease in authentication.

The type of the first identification information is not particularly limited so far as identification information can be identified by magnification, and includes, for example, the shape and the mark. Hereinafter, the type and the mark will be described separately.

(a) Shape

The shape in the present invention is an outer shape of the fine particles of the present invention.

The shape is not particularly limited so far as it can be identified by magnification, and includes any shape, for example, geometrical shape of polygons such as triangle, square, hexagon, octagon, circles, ellipses, prisms such as triangular prism, tetragonal prism, hexagonal prism, and octagonal prism, cylinders such as circular cylinder, pyramids such as triangular pyramid, tetragonal pyramid, hexagonal pyramid, and octagonal pyramid, and cones such as circular cone; symbols such as letters, numerals, signs, and emblems; people, animals, plants, foods, tools, vehicles, buildings, and landscape. Also, these shapes can be used singly or in combination. These shapes can be a shape fitting to application of the fine particles of the present invention, and also a shape expressing a given meaning.

The shape may be a planar shape or a three dimensional shape.

As described above, FIGS. 2A and 2B are schematic views illustrating another example of the fine particles of the present invention and FIG. 2B is an enlarged view of a boxed area 10 illustrated with a dotted line in FIG. 2A. The fine particle 1 exemplified in FIGS. 2A and 2B has the identification information group 2 including the first identification information 3 (letter "A") and the second identification information 4 (letter "a"), and the first identification information 3 (letter "A") is a planar shape.

Figure 3A:
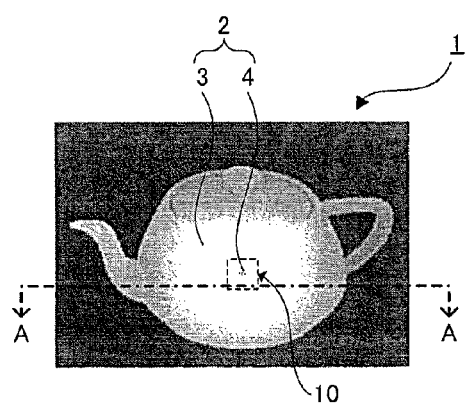
FIGS. 3A to 3C are a schematic view, a sectional view, and an enlarged view illustrating another example of the fine particle of the present invention.
Figure 3B:
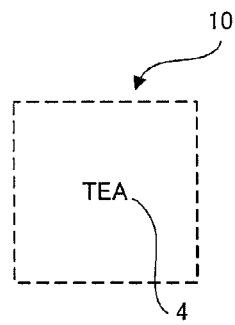
Figure 3C:
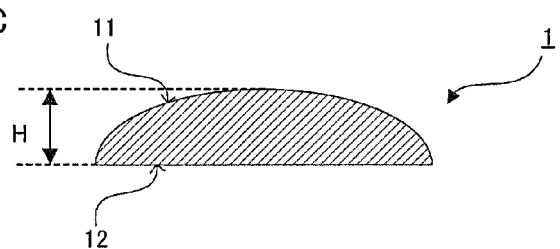

FIGS. 3A to 3C are schematic views illustrating another example of the fine particles of the present invention, FIG. 3B is an enlarged view of a boxed area 10 illustrated with a dotted line in FIG. 3A, and FIG. 3C is a sectional view along the A-A line in FIG. 3A. The fine particle 1 exemplified in FIGS. 3A to 3C has an identification information group 2 including first identification information 3 (teapot shape) and second identification information 4 (letter "TEA"), and the first identification information 3 (teapot shape) is a three dimensional shape.

The three dimensional shape may be a shape constituted only with flat surfaces, a shape constituted with curved surfaces only or a shape constituted with flat and curved surfaces.

Incidentally, the presence of the curved surface in the three dimensional shape can be verified by measuring reflection properties. The flat surface has single normal line direction, whereas the curved surface has different normal line directions with position. Therefore, the brightness of the reflected light on the flat surface is different from that on the curved surface. Also, a change in brightness of the reflected light is different between the flat and curved surfaces when changing the angle of the incident light.

Specifically, the presence of the curved surface in the three dimensional shape can be verified by destructive or non-destructive inspection methods.

The destructive method includes, for example, a method of verifying the presence of the curved surface by cutting a fine particle with a cutter, a razor, or a microtome and magnifying it with a loupe or a microscope for observation.

The non-destructive inspection method includes a method of verifying the presence of the curved surface by contact or non-contact shape measurements. The contact shape measurement includes, for example, a method of using a stylus contact shape measurement machine for measuring the shape by moving a stylus in contact with a fine particle. The non-contact shape measurement includes, for example, a method of using a white light scanning interferometer for shape measurement in which low coherence white light as the light source and a Mirau's or Michelson's equal-path interferometer are used to find the position of the equal path (position where the interference intensity reaches the maximum) for each pixel in CCD corresponding to the measurement surface by vertically scanning the objective lens of the interferometer In the present invention, when the three dimensional shape has the curved surface, the fine particle 1 generally has a surface 11 and a back surface 12 facing the surface 11 as illustrated in FIG. 3C. Incidentally, while not illustrated, the fine particle may have a side surface in addition to the top surface and the back surface.

When the three dimensional shape has the curved surface on the surface of the fine particle, the surface of the fine particle is preferably constituted with 50% or more of the curved surface, and more preferably with 75% or more of the curved surface. The higher the proportion of the curved surface on the surface of the fine particle, the easier the three dimensional shape can be verified by light reflection, thereby making identification easier.

Incidentally, the proportion of the curved surface can be measured by the destructive or non-destructive inspection method described above.

(b) Mark

The mark in the present invention is not particularly limited so far as it can be identified by magnification, and includes, for example, the geometrical shape of polygons such as triangle, square, hexagon, and octagon, circles, ellipses and symbols such as letters, numerals, signs, and emblems. Also, these marks can be used singly or in combination. These marks can be marks fitting to application of the fine particles of the present invention, and also marks expressing given meanings.

Figure 4A:
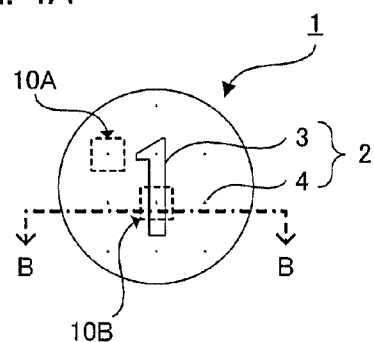
FIGS. 4A to 4I are a schematic view, a sectional view, and an enlarged view illustrating another example of the fine particle of the present invention.
Figure 4B:
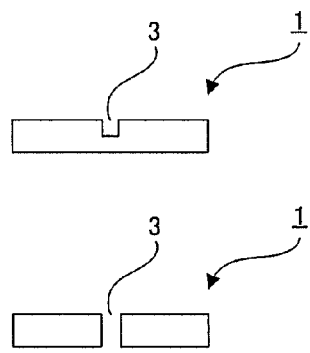
Figure 4C:
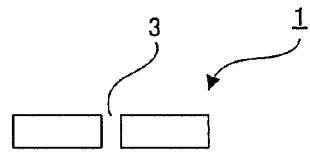

When the first identification information is a mark, the mark formed may be, for example, a concave portion or a convex portion. Also, when the mark formed is the concave portion, there is no preference of the concaved portion with or without penetration. In the example illustrated in FIGS. 4A and 4B, first identification information 3 (numeral "1") is a mark formed as a concave portion without penetration. Also, in the example illustrated in FIGS. 4A and 4C, the first identification information 3 (numeral "1") is a mark formed as a concave portion with penetration. Incidentally, FIGS. 4B and 4C are the sectional view along the B-B line in FIG. 4A.

A method of forming the mark is not particularly limited so far as a desired mark can be formed on parts of the surface of the fine particles. Methods include, for example, a method of forming the mark when preparing the fine particles or after the fine particles are prepared. Methods of forming the mark when preparing the fine particles include a direct marking method with laser and a method of forming the mark when forming the shape of the fine particles by photolithography using a gray scale mask. Also, methods of forming the mark after the fine particles are prepared include a method of forming the mark on parts of the fine particles by a printing method or a forming method.

(2) Second Identification Information

The second identification information in the present invention is one of identification information identifiable by magnification, and identification information which cannot be identified at any magnifying power capable of identifying the first identification information.

The size of the second identification information is not particularly limited so far as it can be identified by magnification but cannot be identified at any magnifying power capable of identifying the first identification information, and preferably 1/10 or less relative to the size of first identification information, more preferably 1/30 or less. This makes it more difficult to learn the presence and the detail of the second identification information, thereby increasing the anti-counterfeiting effects. Specifically, the size of the second identification information is preferably 30 µm or less, and more preferably 5 µm or less. When the size of the second identification information is too large, the second identification information is likely to be identified at any magnifying power capable of identifying the first identification information. Incidentally, decrease of the size of the second identification information makes its manufacture difficult and increases the anti-counterfeiting effects so that a lower limit of the size of the second identification information is appropriately selected depending on the application of the fine particles of the present invention in such cases as confidentiality and fake difficulty are stressed as compared to ease in authentication. However, since it is difficult to form the particle extremely small in size, a lower limit of the size of the second identification information is about 0.4 µm, which is about a wavelength in the visible light region.

The type of second identification information is not particularly limited so far as identification information can be identified by magnification, and includes, for example, the mark.

Incidentally, since the mark is similar to the mark described in the section of the first identification information, its description is herein omitted.

When the second identification information is a mark, there may be a single mark or multiple marks. When there are multiple marks, general anti-counterfeiting technology for printing can be used. It includes, for example, mirror writing, upside down characters, special font characters, character design, size difference, wrong font, misspellings, and irregular arrangement. Application of such anti-counterfeiting technology makes imitation and copy more difficult, thereby enabling to achieve the very effective anti-counterfeiting effects.

For example, in the case of mirror writing, upside down characters, and misspellings, authentication can be obtained by verifying its location. In this case, the location can be visually verified for authentication when magnifying the mark having identification information at any identifiable power.

In the case of special font characters and character design, there is an advantage of difficult preparation of letters, and when difference with other mark is small, analysis of the shape (line width and size) allows authentication. When the mark is obviously different from other mark, the shape can be visually analyzed for authentication when magnifying identification information at any identifiable power.

In the case of size difference, wrong font, and irregular arrangement and slight difference with other mark, analysis of the shape (line width, size, and location) allows authentication. When the mark is obviously different from other mark, the shape is visually analyzed for authentication when magnifying identification information at any identifiable power.

When the second identification information is a mark and the first identification information is also a mark, the second identification information may be formed inside the first identification information or outside the first identification information or in both inside and outside of the first identification information. In the example illustrated in FIG. 4A, the second identification information 4 (letter "A") is formed in both inside and outside of the first identification information 3 (numeral "1").

Figure 4D:
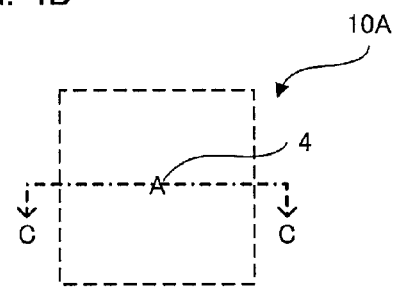
Figure 4E:
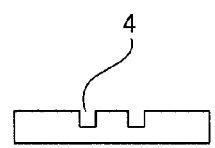
Figure 4F:
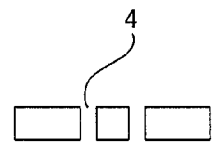

When the second identification information is a mark, for example, the mark formed may be a concave portion or a convex portion. Also, when the mark formed is a concave portion, the concave portion may be with or without penetration. In the example illustrated in FIGS. 4A, 4D, and 4E, the second identification information 4 (letter "A") is a mark, which is formed as a concave portion without penetration. Also, in the example illustrated in FIGS. 4A, 4D, and 4F, the second identification information 4 (letter "A") is a mark, which is formed as a concave portion with penetration. Incidentally, FIG. 4D is an enlarged view of a boxed area 10A illustrated with a dotted line in FIG. 4A, and FIGS. 4E and 4F are sectional views along the C-C line in FIG. 4D.

Figure 4G:
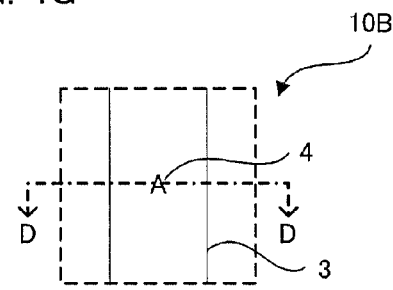
Figure 4H:
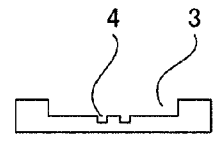
Figure 4I:
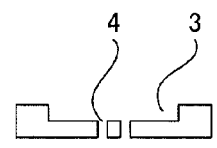

Also, when the first identification information and second identification information are marks and the second identification information is formed inside the first identification information, the mark constituting the first identification information may be formed as a convex portion and the mark constituting the second identification information may be formed as a convex portion, the mark constituting the first identification information may be formed as a convex portion and the mark constituting the second identification information may be formed as a concave portion, the mark constituting the first identification information may be formed as a concave portion and the mark constituting the second identification information may be formed as a convex portion, or the mark constituting the first identification information may be formed as a concave portion and the mark constituting the second identification information may be formed as a concave portion. Also, when the mark for the first identification information formed is a concave portion or convex portion and the mark for the second identification information formed is a concave portion, there is no preference for the concave portion forming the mark of the second identification with or without penetration. In the example illustrated in FIGS. 4A, 4G, and 4H, the first identification information 3 (numeral "1") and the second identification information 4 (letter "A") are marks, which are formed as concave portions, and the concave portion forming the second identification information 4 (letter "A") is not perforated. Also, in the example illustrated in FIGS. 4A, 4G, and 4I, the first identification information 3 (numeral "1") and the second identification information 4 (letter "A") are marks, the mark of the first identification information 3 (numeral "1") formed is a concave portion and the mark of the second identification information 4 (letter "A") formed is a concave portion, and the concave portion forming the mark of the second identification information 4 (letter "A") is perforated. Incidentally, FIG. 4G is an enlarged view of a boxed area 10B illustrated with a dotted line in FIG. 4A, and FIGS. 4H and 4I are sectional views along the D-D line in FIG. 4G.

(3) Other Identification Information

The identification information group in the present invention may have other identification information in addition to the multiple types of the identification information identifiable by magnification.

The type of other identification information is not particularly limited so far as information can be identified, and includes, for example, shape, size, color, light absorption/reflection, and magnetic resonance. Such other identification information is appropriately selected depending on materials for fine particles described below or the like.

The fine particle 1 exemplified in FIGS. 1A and 1B can have identification information such as shape (circle), size, and color (for example, white) in addition to the first identification information 3 (numeral "1") and the second identification information 4 (letter "A").

The fine particle 1 exemplified in FIGS. 2A and 2B can have identification information such as size and color (for example, white) in addition to the first identification information 3 (letter "A") and the second identification information 4 (letter "a")

The shape is the outer shape of the fine particle of the present invention, and is not particularly limited so far as information can be identified. Incidentally, the shape can be similar to the shape described in the section of the first identification information, and its description is herein omitted.

The size is the size of the fine particles of the present invention. Incidentally, the size of the fine particles will be described below, and its description is herein omitted.

Color may be colorless or colored. Also, color may be changed by stimulus with ultraviolet or infrared light. Color is appropriately selected depending on materials of the fine particles described below.

2. Structure of Fine Particle

The particle diameter of the fine particles of the present invention is not particularly limited so far as the fine particles can have the identification information group. When the first identification information is a shape, the particle diameter of the fine particles is in a range of the size identifiable by magnification similarly to the first identification information. Specifically, the particle diameter of the fine particles is preferably 300 μm or less, and more preferably 250 μm or less. When the particle diameter of the fine particles is too large, the fine particles can be visually observed to specify their location when used as an anti-counterfeiting medium, likely lowering the anti-counterfeiting effects. Also, the particle diameter of the fine particles can be preferably observed by a simple magnifying instrument such as a loupe, and specifically is preferably 50 μm or more. When identifiable with a simple magnifying instrument, authenticity can be easily judged. Also, when the particle diameter of the fine particles is too small, it becomes difficult for the fine particles to have desired identification information and to be observed by a simple magnifying instrument, thereby requiring use of a high power magnifying instrument, potentially complicating the judgment of authenticity.

Incidentally, the particle diameter is a size generally used for indicating the grain size of particles and a value measured by a laser method. The laser method is a method, in which particles are dispersed in a solvent and irradiated with a laser beam to disperse the scattered light and compute the mean particle diameter, the grain size distribution, and the like. The particle diameter is a value measured using a particle size analyzer Microtrac UPA Model 9230™ (manufactured by Leeds & Northrup Co., Ltd.), an analyzer using laser.

The thickness of the fine particles of the present invention is not particularly limited so far as the fine particles have enough thickness for having desired identification information, and among them, the thickness is preferably in the range of 0.1 to 500 μm, and more preferably in the range of 1 μm to 100 μm. When the thickness of the fine particles is within the above range, identification information can be easily verified by visual observation with light reflection making identification easier. On one hand, when the fine particles are too thick, manufacture of the fine particles potentially becomes difficult, whereas when the fine particles are too thin, it potentially becomes difficult for the fine particles to have desired identification information.

Incidentally, the thickness of the fine particle is a thickness of a fine particle in cross-section approximately perpendicular to the back surface of the fine particle. For example, the thickness of the fine particle is the thickness H illustrated in FIG. 3C.

Herein, the term "cross-section approximately perpendicular" indicates that an angle formed between the cross-section approximately perpendicular to the back surface of the fine particle and its back surface is within the range of 90 degree±10 degree.

Also, in the present invention, the particle diameter (L) of the fine particle and the thickness (H) of the fine particle preferably meet the relationship of $H/L \geq 1/100$, and among them, more preferably the relationship of $H/L \geq 1/30$, particularly the relationship of $H/L \geq 1/20$, and further more preferably the relationship of $H/L \geq 1/10$. When the ratio of the thickness of the fine particle to the particle diameter of the fine particle is within the above range, identification information is easily verified by visual observation with light reflection, making identification easier. On one hand, when the ratio is too large, manufacture of the fine particles potentially becomes difficult, whereas when the ratio is too small, it potentially becomes difficult for the fine particles to have desired identification information.

Incidentally, the particle diameter (L) and thickness (H) of the fine particle can be measured by a destructive or non-destructive inspection method.

The fine particles of the present invention may be colorless or colored, and color is appropriately selected depending on materials of the fine particle described below.

Also, there is no preference for transparency of the fine particles of the present invention with or without transmittance, and transparency is appropriately selected depending on materials of the fine particle described below.

3. Material for Fine Particle

Materials for the fine particles of the present invention are not particularly limited so far as the fine particle having an identification information group including desired identification information can be manufactured from the material, and for example, resin materials and metal materials can be used. Examples of the resin materials include curable resins such as light curable resins and heat curing resins, thermoplastic resins, and photosensitive resins. Also, metal materials are not particularly limited so far as deposition can be performed by the vapor deposition method, plating method, and sputtering method, and include, for example, metals and metallic compounds such as metal oxides and metal sulfide, and specifically, their examples include Al, ZnS, $TiO_2$, Cu, Au, and Pt.

Among them, materials for the fine particles are preferably resin materials. To the resin materials can be added functional materials described below such as ultraviolet luminescent materials, infrared luminescent materials, infrared reflection materials, infrared absorption materials, quantum dot materials, magnetic materials, and colored materials, and other identification information can be provided to the fine particles in addition to identification information identifiable by magnification. This makes judgment of authenticity easier as well as increases the anti-counterfeiting effects. Also, resin materials can be not only microfabricated but also their use improves the productivity.

The resin materials are preferably resistant to solvents, and among them, preferably insoluble in solvents used when forming a fine particle containing layer in which fine particles are dispersed in a transparent resin using the fine particle of the present invention.

Among the resin materials, photosensitive resins are particularly preferred. As described below, in the section of a manufacture method of fine particles, fine particles can be manufactured in high productivity and at low cost using direct patterning, a gray scale mask, or other method.

The photosensitive resin used can include either one of the positive-type photosensitive resin and the negative-type photosensitive resin.

Figure 5:
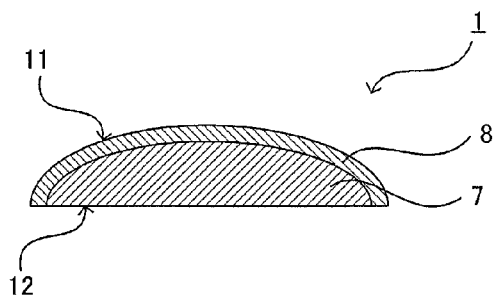
FIG. 5 is a schematic sectional view illustrating another example of the fine particle of the present invention.

Also, as illustrated in FIG. 5, the fine particles of the present invention preferably have a resin layer 7 and a metal layer 8 formed on the resin layer 7 and formed on a surface 11 of a fine particle 1. Formation of the metal layer on the surface of the fine particles increases by light reflection the visibility of the first identification information and second identification information, making judgment of authenticity easier as well as increasing the anti-counterfeiting effects. In particular, when the fine particle containing layer in which the fine particles are dispersed in a transparent resin is formed using the fine particle of the present invention, difference of diffraction indices between the fine particles and the transparent resin is small when forming the fine particles with the resin material so that the interface between the fine particles and the transparent resin is difficult to find, generating a problem of making difficult the visibility of the first identification information and second identification information, but formation of the metal layer on the surface of the fine particles allows an increase of the visibility of the first identification information and second identification information.

The resin materials described above can be used as a material for the resin layer. The metal materials described above can be used as a material for the metal layer.

A method of forming the metal layer includes a vapor deposition method.

The thickness of the metal layer is not particularly limited so far as the thickness can increase the visibility of the first identification information and second identification information when forming the fine particle containing layer in which the fine particles are dispersed in a transparent resin using the fine particle of the present invention, and is, for example, in the range of 1 nm to 250 nm, and preferably in the range of 10 nm to 100 nm. When the metal layer is too thick, the first identification information and second identification information are likely to be impaired, whereas when the metal layer is too thin, formation of the metal layer is potentially difficult and effects to increase the visibility of the first identification information and second identification information cannot potentially be obtained.

When the fine particles of the present invention contain a resin material, the fine particles preferably contain functional materials such as ultraviolet luminescent materials, infrared luminescent materials, infrared reflection materials, infrared absorption materials, quantum dot materials, magnetic materials, and colored materials such as dyes and pigments. As described above, addition of the functional materials makes judgment of authenticity easier as well as increases the anti-counterfeiting effects. Among them, the fine particles of the present invention preferably contain at least one kind selected from the group consisting of ultraviolet luminescent materials, infrared luminescent materials, infrared reflection materials, infrared absorption materials, quantum dot materials, and magnetic materials. These materials can be identified by characteristics of the materials increasing the anti-counterfeiting effects. In particular, the fine particles of the present invention preferably contain at least one kind selected from the group consisting of ultraviolet luminescent materials, infrared luminescent materials, and quantum dot materials. The fine particles can be identified by luminescence, making judgment of authenticity further easier.

Hereinafter, each functional material will be described separately.

(1) Ultraviolet Luminescent Material

Materials emitting fluorescence by absorption of ultraviolet light can be used as an ultraviolet luminescent material in the present invention. Either one of the material emitting fluorescence by absorption of light in the shorter wavelength region (approximately 200 nm to 300 nm) and those emitting fluorescence by absorption of light in longer wavelength region (approximately 300 nm to 400 nm) can be used as an ultraviolet luminescent material. These ultraviolet luminescent materials are materials which are excited by absorption of ultraviolet light to emit the spectrum with a peak in a wavelength range of blue, green, and red when excited photon is returned to lower energy levels, and can be selected appropriately depending on the purpose. Specific examples include $Ca_2B_5O_9Cl:Eu^{2+}$, $CaWO_4$, $ZnO:Zn$, $Zn_2SiO_4:Mn$, $Y_2O_2S:Eu$, $ZnS:Ag$, $YVO_4:Eu$, $Y_2O_3:Eu$, $Gd_2O_2S:Tb$, $La_2O_2S:Tb$, $Y_3Al_5O_{12}:Ce$, $Sr_5(PO_4)_3Cl:Eu$, $3(Ba,Mg)O.8Al_2O_3:Eu$, $Zn_2GeO_4:Mn$, $Y(P,V)O_4:Eu$, $0.5MgF_2.3.5MgO.GeO_2:Mn$, $ZnS:Cu$, and $ZnS:Mn$. These materials may be used singly or in combination of two types or more. Incidentally, the composition of the ultraviolet luminescent materials is represented by the symbol ":" of connecting the major component with the activator or the color luminescent center.

The content of the ultraviolet luminescent material in the fine particles is not particularly limited so far as the material can be identified by luminescence, and adjusted to the range of 1% by mass to 50% by mass.

(2) Infrared Luminescent Material

Materials emitting fluorescence by absorption of infrared light can be used as an infrared luminescent material in the present invention. Infrared luminescent materials are materials which are excited by absorption of infrared light (approximately 800 nm to 1200 nm) to emit the visible light (approximately 400 nm to 800 nm), and can be selected appropriately depending on the purpose. Specific examples include $YF_3:Yb+Er$, $YF_3:Yb+Tm$, and $BaFCl:Yb+Er$. Incidentally, the composition of the infrared luminescent materials is represented by the symbol ":" of connecting the major component with the activator or the color luminescent center.

The content of the infrared luminescent material in the fine particles is not particularly limited so far as the material can be identified by luminescence, and adjusted to the range of about 1% by mass to about 50% by mass.

(3) Infrared Reflection Material

Materials selectively reflecting infrared light in different wavelength can be used as an infrared reflection material in the present invention, and includes, for example, multilayer-structure materials, infrared reflection pigments, and liquid crystal materials having a cholestric structure. The infrared wavelength reflected by the infrared reflection material is not particularly limited, and generally from 800 nm to 2500 nm.

Multilayer-structure materials can include a material constituted with layers (infrared reflection layer) having the infrared reflection surface and formed at intervals so as to reflect infrared light. The multilayer-structure material is a material which reflects infrared light at specific wavelength when meeting the Bragg condition in each layer (infrared reflection layer).

Specifically, the infrared reflection layer can be formed using a multilayer-structure material having a fixed cholesteric structure such as a cross-linked cholesteric liquid crystal.

Infrared reflection pigments can be used in a form of powders and particles of infrared reflection materials, and either one of inorganic and organic pigments can be used. Inorganic pigments include, for example, composite metal oxides such as titanium oxide ($TiO_2$), zinc oxide, zinc sulfide, white lead, antimony oxide, zirconium oxide, indium tin oxide (ITO), and antimony-doped tin oxide (ATO) and metals such as aluminum, gold, and copper. Also, inorganic pigments used include transparent supporting materials such as natural or synthetic mica, other leaf-like silicates, glass flakes, flaky silicon dioxide or aluminum oxide described in JP-A No. 2004-004840 and interference pigments constituted with coated metal oxides. On one hand, organic pigments include, for example, the pigment described in JP-A No. 2005-330466 and JP-A No. 2002-249676, and organic dyes used include azo type dyes, anthraquinone type dyes, phthalocyanine type dyes, perinone/perylene type dyes, indigo/thioindigo type dyes, dioxazine type dyes, quinacridone type dyes, isoindolinone type dyes, isoindoline type dyes, diketopyrrolopyrrole type dyes, azomethine type dyes, and azomethineazo type dyes.

Liquid crystal materials having the cholesteric structure (so called cholesteric liquid crystal material) include a chiral nematic liquid crystal in which a chiral agent is added to a nematic liquid crystal or high molecular weight cholesteric liquid crystal materials.

The content of the infrared reflection material in the fine particles is not particularly limited so far as the material can be identified by reflection of infrared light, and adjusted to the range of about 0.1% by mass to about 50% by mass.

(4) Infrared Absorption Material

Infrared absorption materials used in the present invention are not particularly limited so far as the material can absorb infrared light (800 nm to 1100 nm). Among them, infrared absorption materials which absorb infrared light in the wavelength range of 800 nm to 1100 nm and have little absorption of light in the visible region, that is, the wavelength range of 380 nm to 780 nm and good light transmittance are preferred.

Infrared absorption materials include, for example, organic infrared absorption materials such as polymethine type compounds, cyanine type compounds, phthalocyanine type compounds, naphthalocyanine type compounds, naphthoquinone type compounds, anthraquinone type compounds, dithiol type compounds, immonium type compounds, diimmonium type compounds, aminium type compounds, pyrylium type compounds, cerylium type compounds, squarylium type compound, copper complexes, nickel complexes, dithiol type metal complexes, and a counterion conjugate between benzenedithiol metal complex anion and cyanine type pigment cation disclosed in JP-A No. 2007-163644, and inorganic infrared absorption materials such as composite tungsten oxides disclosed in JP-A No. 2006-154516, tin oxide, indium oxide, magnesium oxide, titanium oxide, chromium oxide, zirconium oxide, nickel oxide, aluminum oxide, zinc oxide, iron oxide, antimony oxide, lead oxide, bismuth oxide, lanthanum oxide, tungsten oxide, and indium tin oxide (ITO). Infrared absorption materials can be used singly or in combination of two types or more. Incidentally, the term "type compound" means that for example, in the case of anthraquinone type compounds, the compounds are anthraquinone derivatives.

Also, infrared absorption materials are appropriately selected depending on the type of resin materials used. For example, when light curable resins or photosensitive resins are used, inorganic near-infrared absorption materials such as composite tungsten oxide are suitable to be used as an infrared absorption material.

The content of infrared absorption materials in the fine particles is not particularly limited so far as the material can be identified by absorption of infrared light, and preferably in the range of 0.1% by mass to 10% by mass. When the content of infrared absorption materials is within the above range, the material can fully express the infrared absorption function as well as transmits visible light sufficiently.

(5) Quantum Dot Material

A quantum dot material is a nanometer size fine particle of a semiconductor, demonstrates unique optical and electric properties by the quantum confinement effects (quantum size effects) in which electrons and excitons are confined in a nanometer size small crystal, and is also called a semiconductor nanoparticle or a semiconductor nanocrystal.

Quantum dot materials used in the present invention are not particularly limited so far as the material is a nanometer size fine particle of a semiconductor and creates the quantum confinement effects (quantum size effects). For example, there is a semiconducting fine particle having luminescence color controlled by own particle diameter and a semiconducting fine particle with a dopant.

Quantum dot materials may be one type of semiconductor compounds or two types or more of semiconductor compounds, and for example, may have a core-shell structure which has a core consisting of the semiconductor compound and a shell consisting of a semiconductor compound different from the core. A typical example includes the core-share structure constituted with a core consisting of CdSe, a ZnS shell provided therearound, and a protective material (called capping material) provided therearound. The quantum dot material emits different color depending on the particle diameter, and for example, when quantum dot is constituted with a core consisting of only CdSe, peak wavelengths of the fluorescence spectrum at the particle diameter of 2.3 nm, 3.0 nm, 3.8 nm, and 4.6 nm are at 528 nm, 570 nm, 592 nm, and 637 nm, respectively.

Examples of materials for the core of quantum dot materials specifically include semiconductor crystals containing semiconductor compounds or semiconductors such as group II-VI semiconductor compounds such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe, group III-V semiconductor compounds such as AlN, AlP, AlAs, AlSb, GaAs, GaP, GaN, GaSb, InN, InAs, InP, InSb, TiN, TiP, TiAs, and TiSb, group IV semiconductors such as Si, Ge, and Pb. Also, semiconductor crystals containing semiconductor compounds containing three or more elements such as InGaP can be used.

Further, quantum dot materials constituted with semiconducting fine particles with a dopant used include semiconductor crystals in which rare earth metal cations or transition metal cations such as $Eu^{3+}$, $Tb^{3+}$, $Ag^+$ or $Cu^+$ are doped in the semiconductor compound.

Among them, semiconductor crystals of CdS, CdSe, CdTe, InP, and InGaP are preferred from the point of view in ease of preparation, control of the particle diameter for regulating emitting light in the visible region, and the quantum yield of fluorescence.

When a core-shell type quantum dot material is used, as semiconductor constituting the shell, the use of the material with a wider band gap than the semiconductor compound forming the core can confine excitons in the core, thereby increasing the luminescence efficiency of the quantum dot material.

Semiconductor compounds having the core-shell structure (core/shell) in which the magnitude of the band gap keeps such a relationship include, for example, CdSe/ZnS, CdSe/ZnSe, CdSe/CdS, CdTe/CdS, InP/ZnS, GaP/ZnS, Si/ZnS, InN/GaN, InP/CdSSe, InP/ZnSeTe, InGaP/ZnSe, InGaP/ZnS, Si/AiP, InP/ZnSTe, InGaP/ZnSTe, and InGaP/ZnSSe.

The size of quantum dots is appropriately controlled for creating light at desired wavelength depending on the material constituting quantum dots. The energy band gap of the quantum dots increases as the particle diameter decreases. That is, the luminescence of the quantum dots is blued-shifted, that is, shifted to the higher energy side as the crystal size decreases. Therefore, variation of the size of the quantum dots allows adjustment of the luminescence wavelength in a whole range of the wavelength of the spectrum in the ultraviolet region, the visible region, and the infrared region.

Generally, the particle diameter (diameter) of a quantum dot is preferably in the range of 0.5 nm to 20 nm, and particularly preferably in the range of 1 nm to 10 nm. The narrower the size distribution of quantum dots, the emission peak is sharper.

Also, the shape of the quantum dots is not particularly limited, and may be spherical, rod-like, disc-like or other shape. When the quantum dot is not spherical, the particle diameter of the quantum dot can be approximated to the value of true sphere having the identical volume.

Information on factors such as the particle diameter, the shape, and the dispersity of the quantum dots can be obtained by measurement with a transmission electron microscope (TEM). Also, the crystal structure and the particle diameter of the quantum dots can be learnt by X-ray crystal diffraction (XRD). Further, information on the particle diameter and the surface of the quantum dots can be obtained by ultraviolet/visible (UV-Vis) absorption spectra.

The content of quantum dot materials in the fine particles is not particularly limited so far as the material can be identified by luminescence, and adjusted to the range of about 0.1% by mass to about 50% by mass.

(6) Magnetic Material

Magnetic materials used in the present invention are materials demonstrating magnetic resonance such as nuclear magnetic resonance (NMR), nuclear quadrupole resonance (NQR), electron spin resonance (ESR), ferromagnetic resonance, antiferromagnetic resonance, ferrimagnetic resonance, domain wall resonance, spin wave resonance, and spin echo resonance.

Since the resonance frequency is determined by the gyromagnetic ratio γ, nuclear specific parameter, and the magnetic field strength of the externally applied magnetic field, selection of the resonance frequency at which the magnetic resonance of the magnetic material occurs allows verification of the presence of the fine particles of the present invention, thereby enabling to judge authenticity.

For example, when the fine particle containing magnetic materials and the fine particle not containing magnetic materials are irradiated with electromagnetic wave having a frequency at which the magnetic materials exhibit nuclear magnetic resonance, the resonance absorption occurs in the fine particles containing the magnetic materials but not in the fine particles free of magnetic particles so that the presence of the fine particles can be verified by observation of the magnetic resonance, thereby enabling to judge authenticity. Also, since factors such as the signal position, intensity, half-width value, and shape of NMR spectra obtained are different depending on the structure, energy state, and the like of the matter, the type of magnetic materials used can be utilized for identification.

Magnetic materials can be used in a form of powders and particles. Examples of magnetic materials include fine particles demonstrating magnetic resonance described in JP-A No. 2005-309418.

The content of the magnetic material in the fine particles is not particularly limited so far as the material can be identified by magnetic resonance, and is preferably in the range of 1% by mass to 30% by mass, and more preferably in the range of 5% by mass to 20% by mass. When the content of the magnetic material is too low, identification potentially becomes difficult, whereas when the content of the magnetic material is too high, preparation of the fine particle having a desired identification information group potentially becomes difficult.

(7) Colored Material

Colored materials used in the present invention include pigments and dyes.

Colored materials are not particularly limited so far as they can be contained in the fine particles, and ordinary pigments and dyes can be used.

The content of the colored material in the fine particles can be adjusted to the range of 0.1% by mass to 50% by mass.

4. Manufacture Method of Fine Particle

A manufacture method of fine particles of the present invention is not particularly limited so far as the method allows manufacture of the fine particle having an identification information group including desired identification information, and an ordinary manufacture method for fine particles comprising identification information can be applied. Also, a manufacture method of fine particles of the present invention can use, for example, a method in which to a substrate are laminated in sequence a sacrifice layer soluble in a solvent and a photosensitive resin layer, which is exposed to light to develop by photolithography to form the identification information group including first identification information and second identification information on the photosensitive resin layer, followed by dissolving the sacrifice layer to manufacture the fine particle constituted with the photosensitive resin. Gray scale exposure can be used in exposure of the photosensitive resin layer, and for example, the direct patterning process by laser and gray scale exposure using a gray scale mask can be used.

5. Application

The fine particles of the present invention are suitable for anti-counterfeiting application and can be used, for example, in gold notes, gift cards, credit cards, identification (ID) cards, passports, drive licenses, brand-name goods, automotive parts, precision equipment parts, home electrical appliances, cosmetics, drugs, foods, supplies for office automation (OA) equipment, sporting goods, compact disc (CD), digital video disc (DVD), software, tobacco, and liquors.

B. Particle Group

Next, a particle group of the present invention will be described.

The particle group of the present invention is a particle group containing multiple fine particles comprising identification information identifiable by magnification, characterized in that the particle group has common identification information common in all of the fine particles contained in the particle group and non-common identification information different between one fine particle and other fine particle contained in the particle group, at least parts of the fine particles are fine particles comprising an identification information group including multiple types of identification information identifiable by magnification, and the identification information group includes first identification information and second identification information which cannot be identified at any magnifying power capable of identifying the first identification information, and among the first identification information and second identification information, one information is used as the common identification information and the other as the non-common identification information.

The particle group of the present invention will be described with reference to the drawings.

Figure 6A:
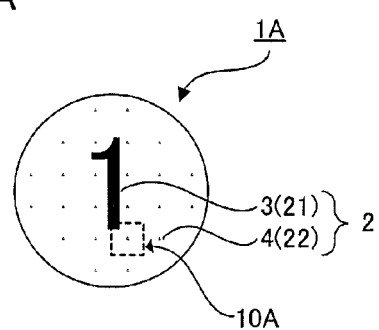
FIGS. 6A to 6D are schematic views and enlarged views illustrating an example of the particle group of the present invention.
Figure 6B:
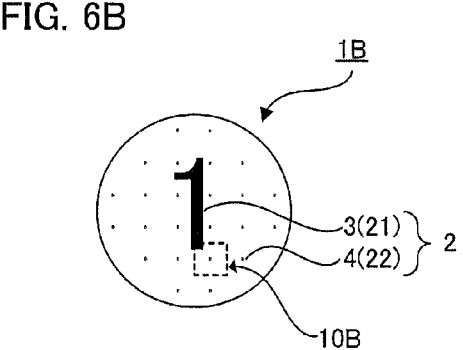
Figure 6C:
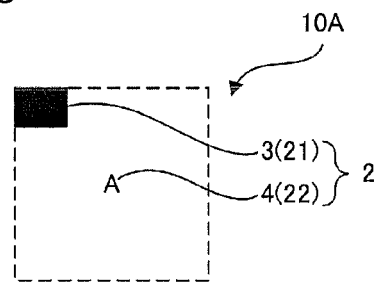
Figure 6D:
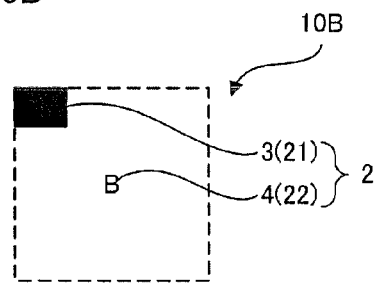

FIGS. 6A to 6D are schematic views illustrating an example of the particle group of the present invention, FIG. 6C is an enlarged view of a boxed area 10A illustrated with a dotted line in FIG. 6A, and FIG. 6D is an enlarged view of a boxed area 10B illustrated with a dotted line in FIG. 6B. A particle group exemplified in FIGS. 6A to 6D contains a fine particle 1A illustrated in FIGS. 6A and 6C and a fine particle 1B illustrated in FIGS. 6B and 6D.

The fine particle 1A exemplified in FIGS. 6A and 6C has an identification information group 2 including first identification information 3 (numeral "1") and second identification information 4 (letter "A"). The second identification information 4 (letter "A") is smaller than the first identification information 3 (numeral "1") and cannot be identified at any magnifying power capable of identifying the first identification information 3 (numeral "1").

The fine particle 1B exemplified in FIGS. 6B and 6D has an identification information group 2 including first identification information 3 (numeral "1") and second identification information 4 (letter "B"). The second identification information 4 (letter "B") is smaller than the first identification information 3 (numeral "1") and cannot be identified at any magnifying power capable of identifying the first identification information 3 (numeral "1").

As exemplified in FIGS. 6A to 6D, in the fine particles 1A and 1B, the first identification information 3 (numeral "1") is common and common identification information 21, whereas the second identification information 4 (letters "A" and "B") is different and non-common identification information 22.

In judgment of authenticity using the particle group containing the fine particles 1A and 1B exemplified in FIGS. 6A to 6D, the first step authentication is firstly performed in which the particle group is magnified at low power to verify that the particle group has in the fine particles 1A and 1B the common identification information 21 of the numeral "1" as the first identification information 3. Next, the second step authentication is performed in which the particle group is magnified at higher power to verify that the particle group has in the fine particles 1A and 1B the non-common identification information 22 of the letters "A" and "B" as the second identification information 4 which cannot be identified at any magnifying power capable of identifying the first identification information 3. In this way, two-step authentication is installed for judging authenticity.

Since the second identification information 4 cannot be identified at any magnifying power capable of identifying the first identification information 3, the authentication level of the second identification information 4 is higher than that of the first identification information 3. Also, since the second identification information 4 is used as the non-common identification information 22 which is different between the fine particles 1A and 1B, the authentication level of the non-common identification information 22 becomes further higher.

Figure 7A:
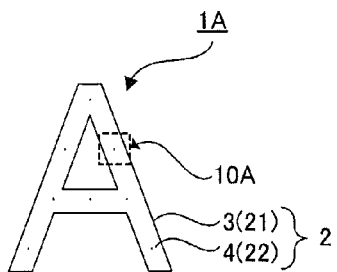
FIGS. 7A to 7D are schematic views and enlarged views illustrating another example of the particle group of the present invention.
Figure 7B:
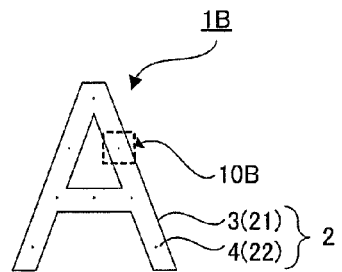
Figure 7C:
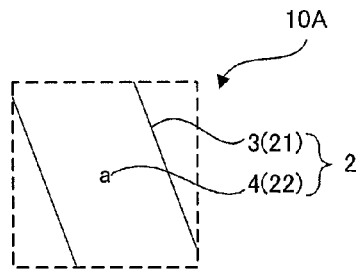
Figure 7D:
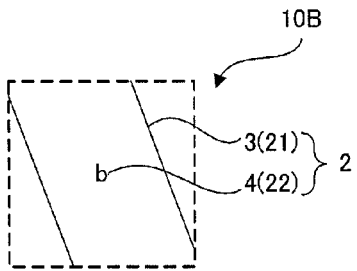

FIGS. 7A to 7D are schematic views illustrating another example of the particle group of the present invention, FIG. 7C is an enlarged view of a boxed area 10A illustrated with a dotted line in FIG. 7A, and FIG. 7D is an enlarged view of a boxed area 10B illustrated with a dotted line in FIG. 7B. The particle group exemplified in FIGS. 7A to 7D contains a fine particle 1A illustrated in FIGS. 7A and 7C and a fine particle 1B illustrated in FIGS. 7B and 7D.

The fine particle 1A exemplified in FIGS. 7A and 7C has an identification information group 2 including first identification information 3 (letter "A") and second identification information 4 (letter "a"). The second identification information 4 (letter "a") is smaller than the first identification information 3 (letter "A") and cannot be identified at any magnifying power capable of identifying the first identification information 3 (letter "A"). The fine particle 1B in FIGS. 7B and 7D has an identification information group 2 including first identification information 3 (letter "A") and second identification information 4 (letter "b"). The second identification information 4 (letter "b") is smaller than the first identification information 3 (letter "A") and cannot be identified at any magnifying power capable of identifying the first identification information 3 (letter "A").

As exemplified in FIGS. 7A to 7D, in the fine particles 1A and 1B, the first identification information 3 (letter "A") is common and common identification information 21, whereas the second identification information (letter "a" and "b") is different and non-common identification information 22.

In judgment of authenticity using the particle group containing the fine particles 1A and 1B exemplified in FIGS. 7A to 7D, first step authentication is firstly performed in which the particle group is magnified at low power to verify that the particle group has in the fine particles 1A and 1B the common identification information 21 of the letter "A" as the first identification information 3. Next, second step authentication is performed in which the particle group is magnified at higher power to verify that the particle group has in the fine particles 1A and 1B the non-common identification information 22 of the letters "a" and "b" as the second identification information 4 which cannot be identified at any magnifying power capable of identifying the first identification information 3. In this way, two-step authentication is installed for judging authenticity.

Since the second identification information 4 cannot be identified at any magnifying power capable of identifying the first identification information 3, the authentication level of the second identification information 4 is higher than that of the first identification information 3. Also, since the second identification information 4 is used as the non-common identification information 22 and the non-common identification information 22 is different between the fine particles 1A and 1B, the authentication level of the non-common identification information 22 becomes further higher.

Figure 8A:
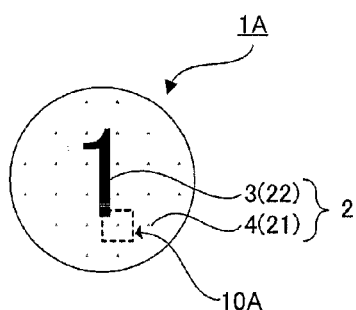
FIGS. 8A to 8D are schematic views and enlarged views illustrating another example of the particle group of the present invention.
Figure 8B:
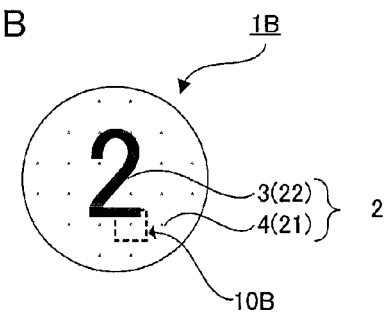
Figure 8C:
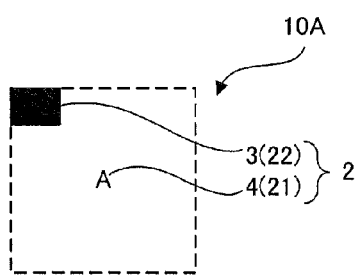
Figure 8D:
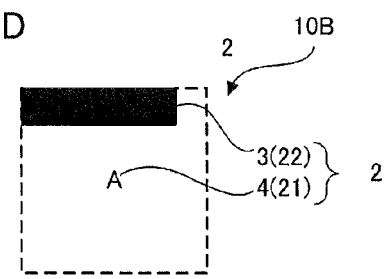

FIGS. 8A to 8D are schematic views illustrating another example of the particle group of the present invention, FIG. 8C is an enlarged view of a boxed area 10A illustrated with a dotted line in FIG. 8A, and FIG. 8D is an enlarged view of a boxed area 10B illustrated with a dotted line in FIG. 8B. The particle group exemplified in FIGS. 8A to 8D contains a fine particle 1A illustrated in FIGS. 8A and 8C and a fine particle 1B illustrated in FIGS. 8B and 8D.

The fine particle 1A exemplified in FIGS. 8A and 8C has an identification information group 2 including first identification information 3 (numeral "1") and second identification information 4 (letter "A"). The second identification information 4 (letter "A") is smaller than the first identification information 3 (numeral "1") and cannot be identified at any magnifying power capable of identifying the first identification information 3 (numeral "1").

A fine particle 1B exemplified in FIGS. 8B and 8D has an identification information group 2 including first identification information 3 (numeral "2") and second identification information 4 (letter "A"). The second identification information 4 (letter "A") is smaller than the first identification information 3 (numeral "1") and cannot be identified at any magnifying power capable of identifying the first identification information 3 (numeral "1").

As exemplified in FIGS. 8A to 8D, in the fine particles 1A and 1B, the second identification information 4 (letter "A") is common and common identification information 21, whereas the first identification information 3 (numerals "1" and "2") is different and non-common identification information 22.

In judgment of authenticity using the particle group containing the fine particles 1A and 1B exemplified in FIGS. 8A to 8D, first step authentication is firstly performed in which the particle group is magnified at low power to verify that the particle group has in the fine particles 1A and 1B the non-common identification information 22 of the numerals "1" and "2" as the first identification information 3. Next, second step authentication is performed in which the particle group is magnified at higher power to verify that the particle group has in the fine particles 1A and 1B the common identification information 21 of the letter "A" as the second identification information 4 which cannot be identified at any magnifying power capable of identifying the first identification information 3. In this way, two-step authentication is installed for judging authenticity.

Since the second identification information 4 cannot be identified at any magnifying power capable of identifying the first identification information 3, the authentication level of the second identification information 4 is higher than that of the first identification information 3. Also, since the non-common identification information 22 is different between the fine particles 1A and 1B, the authentication level of the non-common identification information 22 becomes further higher.

FIGS. 9A to 9D are schematic views illustrating another example of the particle group of the present invention, FIG. 9C is an enlarged view of a boxed area 10A illustrated with a dotted line in FIG. 9A, and FIG. 9D is an enlarged view of a boxed area 10B illustrated with a dotted line in FIG. 9B. The particle group exemplified in FIGS. 9A to 9D contains a fine particle 1A illustrated in FIGS. 9A and 9C and a fine particle 1B illustrated in FIGS. 9B and 9D.

The fine particle 1A exemplified in FIGS. 9A and 9C has an identification information group 2 including first identification information 3 (star shape) and second identification information 4 (letter "a"). The second identification information 4 (letter "a") is smaller than the first identification information 3 (star shape) and cannot be identified at any magnifying power capable of identifying the first identification information 3 (star shape).

The fine particle 1B exemplified in FIGS. 9B and 9D has an identification information group 2 including first identification information 3 (cross shape) and second identification information 4 (letter "a"). The second identification information 4 (letter "a") is smaller than the first identification information 3 (cross shape) and cannot be identified at any magnifying power capable of identifying the first identification information 3 (cross shape).

As exemplified in FIGS. 9A to 9D, in the fine particles 1A and 1B, the second identification information 4 (letter "a") is common and common identification information 21, whereas the first identification information (star shape and cross shape) is different and non-common identification information 22.

In judgment of authenticity using the particle group containing the fine particles 1A and 1B exemplified in FIGS. 9A to 9D, first step authentication is firstly performed in which the particle group is magnified at low power to verify that the particle group has in the fine particles 1A and 1B the non-common identification information 22 of the star shape and the cross shape as the first identification information 3. Next, the second step authentication is performed in which the particle group is magnified at higher power to verify that the particle group has in the fine particles 1A and 1B the common identification information 21 of the letter "a" as the second identification information 4 which cannot be identified at any magnifying power capable of identifying the first identification information 3. In this way, two-step authentication is installed for judging authenticity.

Since the second identification information 4 cannot be identified at any magnifying power capable of identifying the first identification information 3, the authentication level of the second identification information 4 is higher than that of the first identification information 3. Also, since the non-common identification information 22 is different between the fine particles 1A and 1B, the authentication level of the non-common identification information 22 becomes further higher.

FIGS. 10A to 10D are schematic views illustrating another example of the particle group of the present invention, FIG. 10C is an enlarged view of a boxed area 10A illustrated with a dotted line in FIG. 10A, and FIG. 10D is an enlarged view of a boxed area 10B illustrated with a dotted line in FIG. 10B. The particle group exemplified in FIGS. 10A to 10D contains a fine particle 1A illustrated in FIGS. 10A and 10C and a fine particle 1B illustrated in FIGS. 10B and 10D.

The fine particle 1A exemplified in FIGS. 10A and 10C has an identification information group 2 including first identification information 3 (numeral "1") and second identification information 4 (letter "A"). The second identification information 4 (letter "A") is smaller than the first identification information 3 (numeral "1") and cannot be identified at any magnifying power capable of identifying the first identification information 3 (numeral "1").

The fine particle 1B exemplified in FIGS. 10B and 10D has the identification information 5 (numeral "1").

As exemplified in FIGS. 10A to 10D, in the fine particles 1A and 1B, the first identification information 3 is common with the identification information 5 (numeral "1") and common identification information 21, whereas the second identification information 4 (letter "A") is different in term of its presence or absence and non-common identification information 22.

In judgment of authenticity using the particle group containing the fine particles 1A and 1B exemplified in FIGS. 10A to 10D, first step authentication is firstly performed in which the particle group is magnified at low power to verify that the particle group has in the fine particles 1A and 1B the common identification information 21 of the numeral "1" as the first identification information 3 or the identification information 5. Next, second step authentication is performed in which the particle group is magnified at higher power to verify that the particle group has in the fine particles 1A and 1B the non-common identification information 22 indicating the presence or absence of the letter "A" as the second identification information 4 which cannot be identified at any magnifying power capable of identifying the first identification information 3. In this way, two-step authentication is installed for judging authenticity.

Since the second identification information 4 cannot be identified at any magnifying power capable of identifying the first identification information 3, the authentication level of the second identification information 4 is higher than that of the first identification information 3. Also, since the second identification information 4 is used as the non-common identification information 22 and the non-common identification information 22 is different between the fine particles 1A and 1B, the authentication level of the non-common identification information 22 becomes further higher.

In this way, since the particle group of the present invention has common identification information common in all of the fine particles and non-common identification information different between one fine particle and other fine particle, multi-step authentication, authentication of the common identification information and non-common identification information can be performed, thereby enabling to achieve a high level of authentication.

In the present invention, since the second identification information cannot be identified at any magnifying power capable of identifying the first identification information, it becomes difficult to learn the presence and the detail of the second identification information, thereby making the authentication level of the second identification information higher than that of the first identification information. Also, since the non-common identification information is information different between one fine particle and other fine particle, the authentication level of the non-common identification information becomes higher. Since either one of the first identification information and second identification information is used as the common identification information and the other as the non-common identification information, excellent anti-counterfeiting effects can be obtained.

Also, in the present invention, since the first identification information and second identification information can be identified by magnification and among the first and second identification information, one information is the common identification information and the other is the non-common identification information, authenticity can be easily judged by magnifying the fine particles to verify the common identification information and the non-common identification information.

Further, since the second identification information cannot be identified at any magnifying power capable of identifying the first identification information and the first identification information is the common identification information or the non-common identification information, the fine particles are magnified at any power capable of identifying the first identification information to verify only the first identification information and then verify only either one of the common identification information and non-common identification information, thereby enabling to assure the genuineness and easily judge authenticity.

Further, in the present invention, since the fine particles have not only the first identification information but also the second identification information which cannot be identified by any magnifying power capable of identifying the first identification information, manufacture of the fine particles is complex making imitation and copy difficult, thereby enabling to achieve a high level of the anti-counterfeiting effects as well as a deterrent effect.

Hereinafter, each constitution in the particle group of the present invention will be described.

1. Common Identification Information

The common identification information in the present invention is information common in all of the fine particles contained in the particle group.

In the present invention, at least parts of the fine particles have an identification information group including multiple types of identification information identifiable by magnification, in which the identification information group includes first identification information and second identification information which cannot be identified at any magnifying power capable of identifying the first identification information, and the first identification information or second identification information is used as the common identification information.

Incidentally, the first identification information and second identification information are described in the section of "A. Fine particle", and its description is herein omitted.

The first identification information or second identification information may be used as the common identification information. In the examples illustrated in FIGS. 6A to 6D, FIGS. 7A to 7D, and FIGS. 10A to 10D, the first identification information 3 is used as the common identification information 21. On one hand, in the examples illustrated in FIGS. 8A to 8D and FIGS. 9A to 9D, the second identification information 4 is used as the common identification information 21.

Also, other identification information may be used as the common identification information in addition to the first identification information or second identification information.

The type of other identification information is not particularly limited so far as information can be identified, and includes, for example, shape, size, color, light absorption/reflection, and magnetic resonance.

In the examples illustrated in FIGS. 6A to 6D, shape (circle), size, and color (for example, white) can be used as the common identification information 21 in addition to the first identification information 3 (numeral "1").

In the examples illustrated in FIGS. 7A to 7D, size and color (for example, white) can be used as the common identification information 21 in addition to the first identification information 3 (letter "A").

In the examples illustrated in FIGS. 8A to 8D, shape (circle), size, and color (for example, white) can be used as the common identification information 21 in addition to the second identification information 4 (letter "A").

In the examples illustrated in FIGS. 9A to 9D, color (for example, white) can be used as the common identification information 21 in addition to the second identification information 4 (letter "a").

In the examples illustrated in FIGS. 10A to 10D, shape (circle), size, and color (for example, white) can be used as the common identification information 21 in addition to the first identification information 3 (numeral "1").

Incidentally, other identification information can be selected similarly to the information described in the section of "A. Fine particle", and its description is herein omitted.

2. Non-Common Identification Information

The non-common identification information in the present invention is information different between one fine particle and other fine particle contained in the particle group.

In the present invention, at least parts of the fine particles have an identification information group including multiple types of identification information identifiable by magnification, in which the identification information group includes first identification information and second identification information which cannot be identified at any magnifying power capable of identifying the first identification information, and the first identification information or second identification information is used as the non-common identification information.

Incidentally, the first identification information and second identification information are described in detail in the section of "A. Fine particle", and its description is herein omitted.

The first identification information or second identification information may be used as the non-common identification information. In the examples illustrated in FIGS. 8A to 8D and FIGS. 9A to 9D, the first identification information 3 is used as the non-common identification information 22. On one hand, in the examples illustrated in FIGS. 6A to 6D, FIGS. 7A to 7D, and FIGS. 10A to 10D, the second identification information 4 is used as the non-common identification information 22.

When the first identification information is used as the non-common identification information and is a shape or a mark and the way to express the shape or the mark is identical, the shape or the mark can be used as the non-common identification information by applying ordinary printing technology for preventing counterfeit. The shape and the mark include, for example, mirror writing, upside down characters, special font characters, character design, size difference, wrong font, misspellings, and irregular arrangement. Application of such anti-counterfeiting technology makes imitation and copy more difficult and a high level of anti-counterfeiting effects can be obtained.

When the second identification information is used as the non-common identification information, difference in second identification information or the presence or absence of the second identification information may be used as the non-common identification information.

Also, when the second identification information is used as the non-common identification information and is a mark, the mark can be used as the non-common identification information by applying ordinary printing technology for preventing counterfeit as described above. Application of such anti-counterfeiting technology makes imitation and copy more difficult and a high level of anti-counterfeiting effects can be obtained.

Also, other identification information may be used as the non-common identification information in addition to use the first identification information or second identification information.

The type of other identification information is not particularly limited so far as information can be identified, and includes, for example, shape, size, color, light absorption/reflection, and magnetic resonance.

Figure 11A:
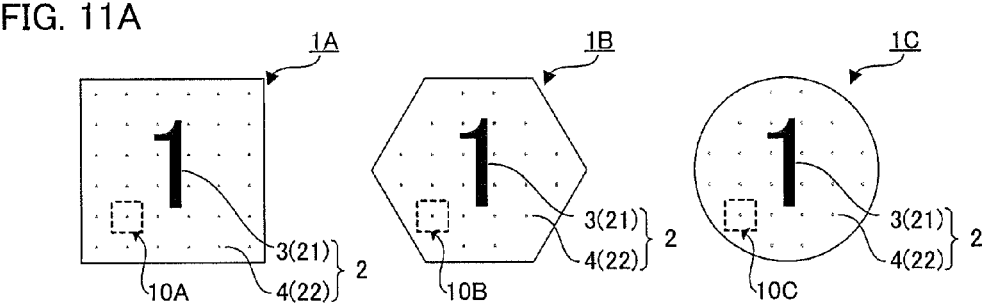
FIGS. 11A and 11B are a schematic view and an enlarged view illustrating another example of the particle group of the present invention.
Figure 11B:
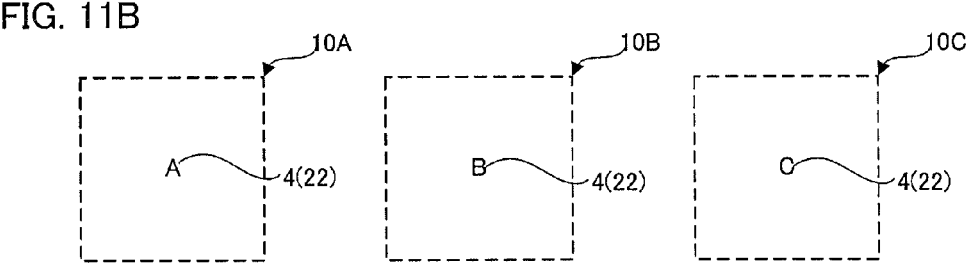

In a particle group containing fine particles 1A, 1B, and 1C exemplified in FIGS. 11A and 11B, the shape (square, hexagon, and circle) can be used as the non-common identification information 22 in addition to the second identification information 4 (letters "A", "B", and "C"). Incidentally, FIG. 11B is an enlarged view of boxed areas 10A, 10B, and 10C illustrated with a dotted line in FIG. 11A.

Figure 12A:
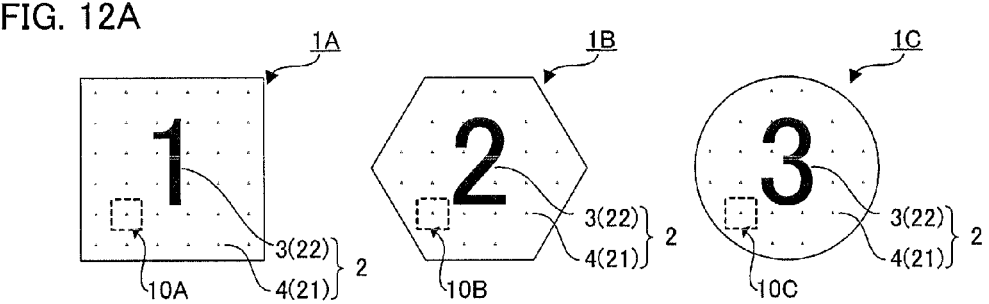
FIGS. 12A and 12B are a schematic view and an enlarged view illustrating another example of the particle group of the present invention.
Figure 12B:
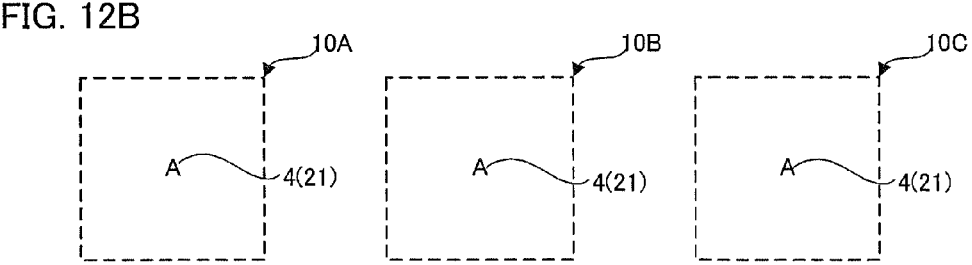

In a particle group containing fine particles 1A, 1B, and 1C exemplified in FIGS. 12A and 12B, the shape (square, hexagon, and circle) can be used as the non-common identification information 22 in addition to the first identification information 3 (numerals "1", "2", and "3"). Incidentally, FIG. 12B is an enlarged view of boxed areas 10A, 10B, and 10C illustrated with a dotted line in FIG. 12A.

Figure 13A:
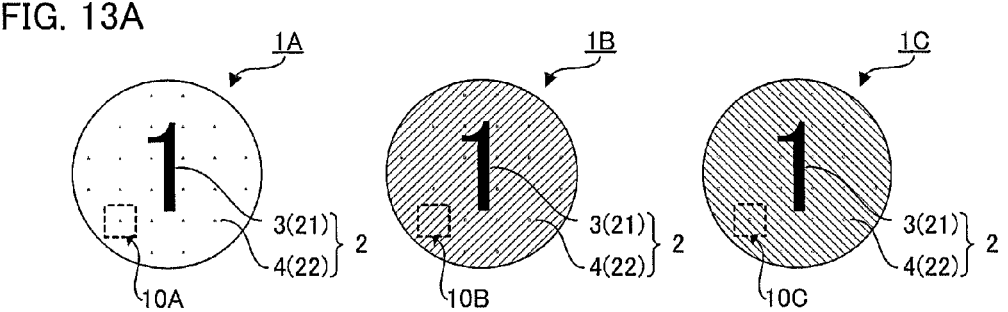
FIGS. 13A and 13B are a schematic view and an enlarged view illustrating another example of the particle group of the present invention.
Figure 13B:
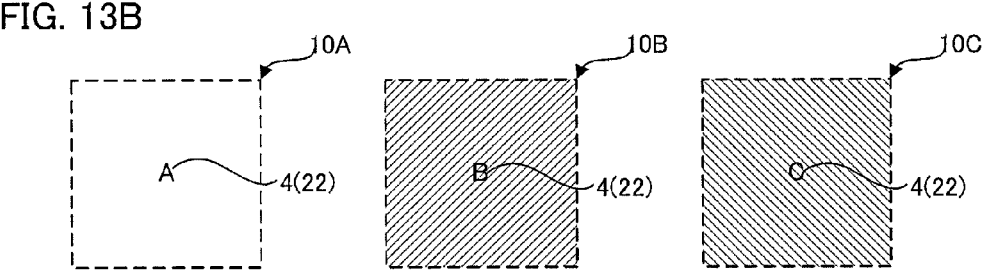

In a particle group containing fine particles 1A, 1B, and 1C exemplified in FIGS. 13A and 13B, color can be used as the non-common identification information 22 in addition to the second identification information 4 (letters "A", "B", and "C") Incidentally, FIG. 13B is an enlarged view of boxed areas 10A, 10B, and 10C illustrated with a dotted line in FIG. 13A.

Figure 14A:
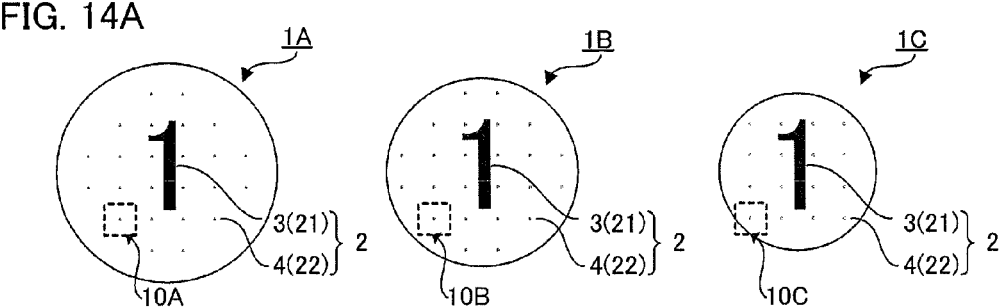
FIGS. 14A and 14B are a schematic view and an enlarged view illustrating another example of the particle group of the present invention.
Figure 14B:
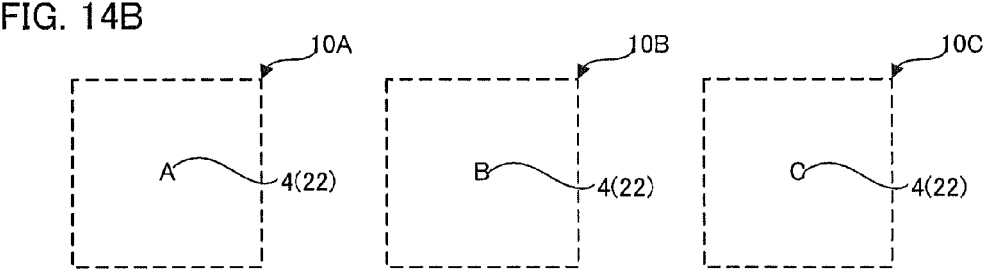

In a particle group containing fine particles 1A, 1B, and 1C exemplified in FIGS. 14A and 14B, the size can be used as the non-common identification information 22 in addition to the second identification information 4 (letters "A", "B", and "C"). Incidentally, FIG. 14B is an enlarged view of boxed areas 10A, 10B, and 10C illustrated with a dotted line in FIG. 14A

Incidentally, other identification information is similar to that described in the section of "A. Fine particle", and its description is herein omitted.

The non-common identification information is information different between one fine particle and other fine particle contained in the particle group, and when the first identification information or second identification information is used as the non-common identification information, the first identification information is different from the second identification information. In this case, as exemplified in FIGS. 6A to 6D, FIGS. 7A to 7D, FIGS. 8A to 8D, FIGS. 9A to 9D, and FIGS. 10A to 10D, two types of identification information may be combined for the non-common identification information, or as exemplified in FIGS. 11A to 11B, FIGS. 12A to 12B, FIGS. 13A to 13B, and FIGS. 14A to 14B, three types of identification information may be combined for the non-common identification information, or four types or more of identification information may be combined for the non-common identification information while not illustrated.

The non-common identification information is information different between one fine particle and other fine particle contained in the particle group. The abundance ratio of the fine particles comprising different information is not particularly limited, and may be comparable or different. Among them, the abundance ratio of the fine particles comprising different information is preferably different. This makes difficult verification of the non-common identification information to increase the anti-counterfeiting effects, thereby enabling to achieve a higher level of judgment of authenticity.

For example, when there are two types of fine particles comprising different information, the abundance ratio of two types of fine particles is preferably in the range of 100:1 to 1:1, and among them, more preferably in the range of 20:1 to 1:1. Keeping the abundance ratio in the above range makes verification of the non-common identification information optimal.

3. Fine Particle

The particle group of the present invention contains multiple fine particles comprising identification information identifiable by magnification. Among the multiple particles, at least parts of the fine particles have an identification information group including multiple types of identification information identifiable by magnification, in which the identification information group includes first identification information and second identification information which cannot be identified at any magnifying power capable of identifying the first identification information.

Since the fine particles comprising an identification information group including the multiple types of identification information identifiable by magnification, in which the identification information group includes the first identification information and second identification information which cannot be identified at any magnifying power capable of identifying the first identification information, are similar to those described in the section of "A. Fine particle", its description is herein omitted.

In the multiple fine particles comprising identification information contained in the particle group of the present invention, at least parts of the fine particles may have an identification information group including the first identification information and second identification information, and for example, all of the fine particles may be fine particles comprising the identification information group including the first identification information and second identification information, in which the particle group of the present invention may contain only the fine particles comprising the identification information group including the first identification information and second identification information, or parts of the fine particles may be fine particles comprising the identification information group including the first identification information and second identification information, in which the particle group of the present invention may contain the fine particles comprising the identification information group including the first identification information and second identification information and other fine particles comprising identification information.

For example, any one of the fine particles 1A and 1B illustrated in FIGS. 6A to 6D, FIGS. 7A to 7D, FIGS. 8A to 8D, and FIGS. 9A to 9D is a fine particle having the identification information group 2 including the first identification information 3 and the second identification information 4. On one hand, for example, in FIGS. 10A to 10D, the fine particle 1A is a fine particle having the identification information group 2 including the first identification information 3 and the second identification information 4, and the fine particle 1B is other fine particle having the identification information 5.

Other fine particles comprising identification information are not particularly limited so far as fine particles have identification information identifiable by magnification and a combination of fine particles comprising an identification information group including the first identification information and second identification information with other fine particles comprising identification information allows use of either one of the first identification information and second identification information as the common identification information and other as the non-common identification information.

Identification information included in other fine particles is not particularly limited so far as information can be identified by magnification, and can be similar to first identification information described in the section of "A. Fine particle".

Also, the structure, materials, and a manufacture method of other fine particles can be similar to the structure, materials, and the manufacture method described in the section of "A. Fine particle".

The number of different types of the multiple fine particles contained in the particle group of the present invention may be two or more. For example, in FIGS. 6A to 6D, FIGS. 7A to 7D, FIGS. 8A to 8D, FIGS. 9A to 9D, and FIGS. 10A to 10D, the particle group contains two types of fine particles, whereas in FIGS. 11A to 11B, FIGS. 12A to 12B, FIGS. 13A to 13B, and FIGS. 14A to 14B, the particle group contain three types of fine particles.

4. Application

Application of the particle group of the present invention is similar to the application described in the section "A. Fine particle".

C. Anti-Counterfeiting Ink

Next, an anti-counterfeiting ink of the present invention will be described.

The anti-counterfeiting ink of the present invention comprises the fine particles described above or the particle group described above.

In the present invention, the use of the fine particles described above or the particle group described above allows achievement of a high level of authentication and the use of the anti-counterfeiting ink of the present invention can yield anti-counterfeiting mediums excellent in the anti-counterfeiting effects. Also, when the anti-counterfeiting ink of the present invention is applied to anti-counterfeiting mediums, fine particles are easily fixed onto a supporting body by applying the anti-counterfeiting ink to the supporting body so that various supporting bodies can be used, thereby generating an advantage of wider option in factors such as shape of the supporting body.

Hereinafter, each constitution in the anti-counterfeiting ink of the present invention will be described.

1. Fine Particle

Since the fine particles used in the present invention are described in detail in the section of "A. Fine particle", its description is herein omitted.

As the fine particles, one type of fine particles may be used or two types or more of fine particles may be used. For example, when two types or more of fine particles are used, fine particles are combined so as to express a given meaning.

The content of the fine particles in the anti-counterfeiting ink is not particularly limited so far as authenticity can be judged by the fine particles when the anti-counterfeiting ink of the present invention is used in anti-counterfeiting mediums, and is can be in the range of 0.01% by mass to 50% by mass.

2. Particle Group

Since the particle group used in the present invention is described in detail in the section of "B. Particle group", its description is herein omitted.

The content of the particle group in the anti-counterfeiting ink is not particularly limited so far as authenticity can be judged by the particle group when the anti-counterfeiting ink of the present invention is used in anti-counterfeiting mediums, and can be in the range of 0.01% by mass to 50% by mass.

3. Transparent Resin Composition

The anti-counterfeiting ink of the present invention is generally an ink in which the fine particles described above or the particle group described above is dispersed in a transparent resin composition.

Light transmission of the transparent resin composition used in the present invention is not particularly limited so far as the fine particles or the particle group can be observed when forming the fine particle containing layer in which the fine particles or the particle group is dispersed in the transparent resin using the anti-counterfeiting ink of the present invention, and the total light transmittance in the visible region is preferably 10% or more when the transparent resin composition is converted to a film with a given thickness.

Incidentally, the total light transmittance is a value measured in accordance with JIS K7105.

The transparent resin composition is not particularly limited so far as the resin composition meets the above light transmittance, and for example, any one of light curable resin compositions, heat curable resin compositions, and thermoplastic resin compositions can be used. Among them, curable resin compositions such as light curable resin compositions and heat curable resin compositions are preferred, and particularly light curable resin compositions are preferred. Use of the light curable resin compositions allows application of the anti-counterfeiting ink of the present invention to a supporting body with low heat resistance, thereby widening options in application. Also, productivity can be increased when forming the fine particle containing layer in which the fine particles or the particle group is dispersed in transparent resins using the anti-counterfeiting ink of the present invention.

4. Functional Material

The anti-counterfeiting ink of the present invention may contain functional materials such as ultraviolet luminescent materials, infrared luminescent materials, infrared reflection materials, infrared absorption materials, and quantum dot materials in addition to the fine particles or the particle group and the transparent resin composition.

For example, when the anti-counterfeiting ink contains an ultraviolet luminescent material or an infrared luminescent material and the fine particles do not contain an ultraviolet luminescent material or an infrared luminescent material, or there is no fine particle containing an ultraviolet luminescent material or an infrared luminescent material in the particle group, the presence or absence of luminescence allows specification of the location of the fine particles, making judgment of authenticity easier as well as increasing the anti-counterfeiting effects. Also, when the anti-counterfeiting ink contains an ultraviolet luminescent material or an infrared luminescent material and the fine particles also contain an ultraviolet luminescent material or an infrared luminescent material, or there are fine particles containing an ultraviolet luminescent material or an infrared luminescent material in the particle group, the luminescence wavelength allows specification of the location of the fine particles, making judgment of authenticity easier as well as increasing the anti-counterfeiting effects.

When the anti-counterfeiting ink contains an infrared reflection material or an infrared absorption material and the fine particles do not contain an infrared reflection material or an infrared absorption material or there is no fine particle containing an infrared reflection material or an infrared absorption material in the particle group, the presence or absence of infrared absorption or reflection allows the specification of the location of the fine particles, making judgment of authenticity easier as well as increasing the anti-counterfeiting effects. Also, when the anti-counterfeiting ink contains an infrared reflection material or an infrared absorption material and the fine particles also contain an infrared reflection material or an infrared absorption material, or there are fine particles containing an infrared reflection material or an infrared absorption material in the particle group, the wavelength of infrared absorption or reflection allows the specification of the location of the fine particles, making judgment of authenticity easier as well as increasing the anti-counterfeiting effects.

When the anti-counterfeiting ink contains a quantum dot material and fine particles do not contain a quantum dot material or there is no fine particle containing a quantum dot material in the particle group, the presence or absence of light reflection allows the specification of the location of the fine particles, making judgment of authenticity easier as well as increasing the anti-counterfeiting effects. Also, when the anti-counterfeiting ink contains a quantum dot material and fine particles also contain a quantum dot material or there are fine particles containing a quantum dot material in the particle group, the luminescence wavelength allows the specification of the location of the fine particles, making judgment of authenticity easier as well as increasing the anti-counterfeiting effects.

Incidentally, functional materials are similar to those described in the section of "A. Fine particle", and its description is herein omitted.

The content of an ultraviolet luminescent material in anti-counterfeiting ink is not particularly limited so far as the material can be identified by luminescence, and is in the range of about 1% by mass to about 50% by mass.

The content of the infrared luminescent material in the anti-counterfeiting ink is not particularly limited so far as the material can be identified by luminescence, and is in the range of about 1% by mass to about 50% by mass.

The content of the infrared reflection material in the anti-counterfeiting ink is not particularly limited so far as the material can be identified by infrared reflection, and is in the range of about 0.1% by mass to about 50% by mass.

The content of the infrared absorption material in the anti-counterfeiting ink is not particularly limited so far as the material can be identified by infrared absorption, and is preferably in the range of 0.1% by mass to 10% by mass. When the content of the infrared absorption material is within the above range, the function of infrared absorption by the material is fully expressed as well as visible light is sufficiently transmitted by the material.

The content of the quantum dot material in the anti-counterfeiting ink is not particularly limited so far as the material can be identified by luminescence, and is in the range of about 0.1% by mass to about 50% by mass.

5. Solvent

The anti-counterfeiting ink of the present invention may contain a solvent. Solvents are not particularly limited so far as the fine particles or the particle group and the transparent resin composition can be dispersed therein, and appropriately selected depending on the application method of the anti-counterfeiting ink and other factors. Also, a solvent may be used singly or two types or more of solvents may be mixed for use.

For example, solvents for gravure printing inks include toluene, ethyl acetate, methyl ethyl ketone, and isopropyl alcohol. Solvents for offset printing inks and silk screen printing inks include petroleum solvents with high boiling point (hydrocarbons with the number of carbon atom of 15 or higher (C15 or higher)).

The solid content of the anti-counterfeiting ink of the present invention is not particularly limited so far as the anti-counterfeiting ink can be applied to anti-counterfeiting mediums, and is in the range of about 20% by mass to about 85% by mass.

D. Anti-Counterfeiting Toner

Next, an anti-counterfeiting toner of the present invention will be described.

The anti-counterfeiting toner of the present invention comprises the fine particles described above or the particle group described above.

In the present invention, the use of the fine particles described above or the particle group described above can achieve a high level of authentication and the use of the anti-counterfeiting toner of the present invention can yield anti-counterfeiting mediums with excellent anti-counterfeiting effects. Also, when the anti-counterfeiting toner of the present invention is applied to the anti-counterfeiting medium, the fine particles or the particle group can be easily fixed onto a supporting body by transferring the anti-counterfeiting toner of the present invention on the supporting body so that various supporting bodies can be used, thereby generating an advantage of wider options in factors such as the shape of supporting body.

The anti-counterfeiting toner of the present invention may be a toner containing the fine particle or the particle group, may be any one of a dry toner or a wet toner, and its composition can be general composition. The anti-counterfeiting toner of the present invention may contain, for example, a major resin, a minor resin, a colorant, a charge control agent, and a fluidity control agent.

Major resins are not particularly limited so far as they have light transmission and can disperse the fine particle or the particle group. The light transmittance of the major resin is adjusted to similar to that of the transparent resin composition in the anti-counterfeiting ink described above. Styrene-acrylic type resins and polyester type reins are mainly used as a major resin. Polypropylene, polyethylene, and waxes are used as a minor resin. One type of major resins and minor resin may be used singly or two types or more of them may be mixed for use.

Colorants used include carbon, cyan pigments, magenta pigments, and yellow pigments. As a charge control agent, there are a positive charge type and a negative charge type and the charge control agent includes a metal containing type, a resin type, and quaternary ammonium salt type. Silica and the like are used as a fluid control agent.

Incidentally, since fine particles and a particle group can be similar to the fine particles and the particle group in the anti-counterfeiting ink described above, its description is herein omitted.

The anti-counterfeiting toner of the present invention may further contain functional materials such as ultraviolet luminescent materials, infrared luminescent materials, infrared reflection materials, infrared absorption materials, and quantum dot materials. The functional material can be similar to the functional material in the anti-counterfeiting ink described above.

E. Anti-Counterfeiting Sheet

Next, an anti-counterfeiting sheet of the present invention will be described.

The anti-counterfeiting sheet of the present invention comprises an identification information group including multiple types of identification information identifiable by magnification, in which the identification information group includes first identification information and second identification information which cannot be identified at any magnifying power capable of identifying the first identification information are used, and has two embodiments. A first embodiment of the anti-counterfeiting sheet of the present invention is a sheet comprising fine particles comprising the identification information group. Also, a second embodiment of the anti-counterfeiting sheet of the present invention comprises a base part and an identification part formed on the surface of the base part and having the identification information group.

Hereinafter, each embodiment will be described separately.

1. First Embodiment

An anti-counterfeiting sheet of the present embodiment comprises a fine particle containing layer in which the fine particle described above or the particle group described above is dispersed in a transparent resin.

The anti-counterfeiting sheet of the present embodiment will be described with reference to the drawings.

Figure 15:
FIG. 15 is a schematic sectional view illustrating an example of the anti-counterfeiting sheet of the present invention.

FIG. 15 is a schematic sectional view illustrating an example of an anti-counterfeiting sheet of the present invention. An anti-counterfeiting sheet 30 illustrated in FIG. 15 is a sheet comprising a fine particle containing layer 32 in which a given fine particle 1 is dispersed in a transparent resin 31.

In the present embodiment, since there is a fine particle containing layer containing the fine particle described above or the particle group described above, the sheet can achieve a high level of authentication, and the use of the anti-counterfeiting sheet of the present embodiment can yield anti-counterfeiting mediums with the excellent anti-counterfeiting effects. Also, when in applying the fine particle or the particle group to anti-counterfeiting mediums, the amount of ink containing the fine particle or the particle group applied to a supporting body is too little, the fine particle or the particle group is potentially absent on the supporting body, likely resulting in no anti-counterfeiting effect. In the present embodiment, however, its application to the anti-counterfeiting medium can be performed under the condition in which the number of fine particles on the anti-counterfeiting sheet is known in advance so that the anti-counterfeiting effects can be consistently established. Further, in the present embodiment, mapping of the location of the fine particles on the anti-counterfeiting sheet can be performed enabling to achieve a high level of anti-counterfeiting. Also, the anti-counterfeiting sheet of the present embodiment has an advantage of easy application to the anti-counterfeiting medium. Further, the anti-counterfeiting sheet of the present embodiment can be easily laminated to other sheet enabling to add in value.

Figure 16:
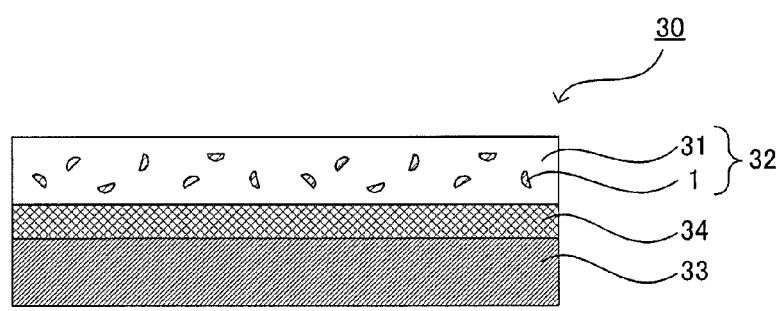
FIG. 16 is a schematic sectional view illustrating another example of the anti-counterfeiting sheet of the present invention.

FIG. 16 is a schematic sectional view illustrating an example of the anti-counterfeiting sheet of the present embodiment. In an anti-counterfeiting sheet 30 illustrated in FIG. 16, a delaminating layer 33, an adhesive layer 34, and a fine particle containing layer 32 in which a given fine particle 1 is dispersed in a transparent resin 31 are laminated in sequence.

Figure 17:
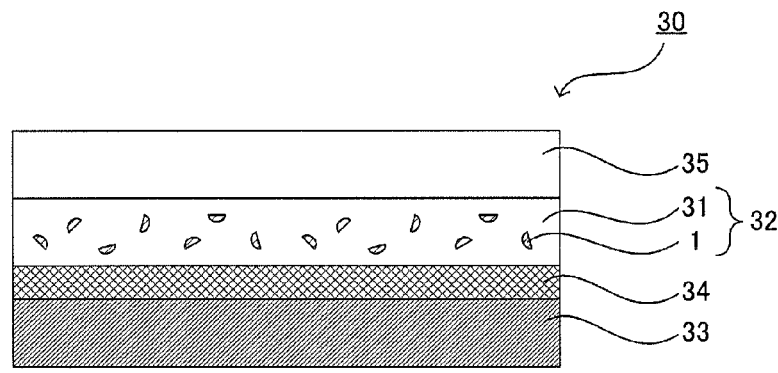
FIG. 17 is a schematic sectional view illustrating another example of the anti-counterfeiting sheet of the present invention.

FIG. 17 is a schematic sectional view illustrating another example of the anti-counterfeiting sheet of the present embodiment. An anti-counterfeiting sheet 30 illustrated in FIG. 17 has a substrate 35 and a fine particle containing layer 32 formed on the substrate 35 and having the given fine particle 1 dispersed in a transparent resin 31, and an adhesive layer 34 and a delaminating layer 33 are laminated on the side of a fine particle containing layer 32.

Figure 18:
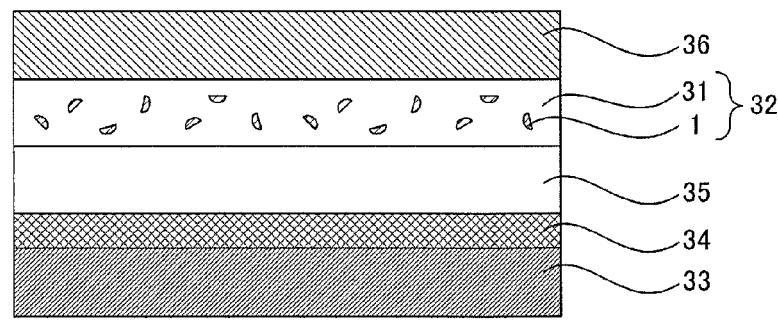
FIG. 18 is a schematic sectional view illustrating another example of the anti-counterfeiting sheet of the present invention.

FIG. 18 is a schematic sectional view illustrating another example of the anti-counterfeiting sheet of the present embodiment. An anti-counterfeiting sheet 30 illustrated in FIG. 18 has a substrate 35, a fine particle containing layer 32 formed on the substrate 35 and having a given fine particle 1 dispersed in a transparent resin 31, and a hard coat layer 36 formed on the fine particle containing layer 32, and an adhesive layer 34 and a delaminating layer 33 are laminated in sequence to the side of the substrate 35.

Figure 19:
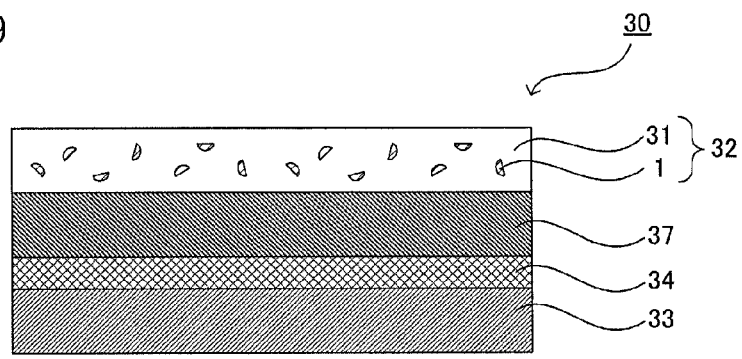
FIG. 19 is a schematic sectional view illustrating another example of the anti-counterfeiting sheet of the present invention.

FIG. 19 is a schematic sectional view illustrating another example of the anti-counterfeiting sheet of the present embodiment. In an anti-counterfeiting sheet 30 illustrated in FIG. 19, a delaminating layer 33, an adhesive layer 34, a hologram layer 37, and a fine particle containing layer 32 in which a given fine particle 1 is dispersed in a transparent resin 31 are laminated in sequence.

Figure 20:
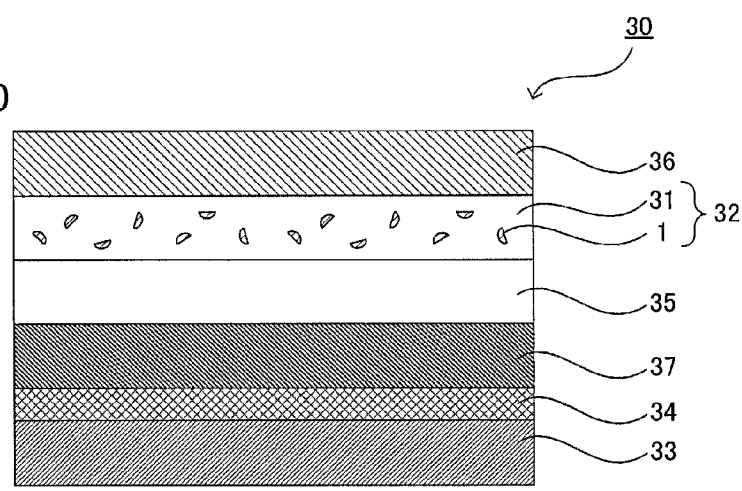
FIG. 20 is a schematic sectional view illustrating another example of the anti-counterfeiting sheet of the present invention.

FIG. 20 is a schematic sectional view illustrating another example of the anti-counterfeiting sheet of the present embodiment. An anti-counterfeiting sheet 30 illustrated in FIG. 20 has a substrate 35, a fine particle containing layer 32 formed on the substrate 35 and having a given fine particle 1 dispersed in a transparent resin 31, and a hard coat layer 36 formed on the fine particle containing layer 32, and a hologram layer 37, an adhesive layer 34 and a delaminating layer 33 are laminated in sequence to the side of the substrate 35.

In this way, the anti-counterfeiting sheet of the present embodiment may have other constitution in addition to the fine particle containing layer.

Hereinafter, each constitution in the anti-counterfeiting sheet of the present embodiment will be described.

(1) Fine Particle Containing Layer

The fine particle containing layer in the present embodiment is a layer in which the fine particle described above or the particle group described above is dispersed in a transparent resin.

Incidentally, since fine particles are described in the section of "A. Fine particle" and the particle group is described in the section of "B. Particle group", its description is herein omitted.

When the fine particle containing layer contains the fine particle described in the section "A. Fine particle", one type of fine particles or two types or more of fine particles may be used as a fine particle. For example, when two types or more of fine particles are used, fine particles are combined so as to express a given meaning.

Light transmittance of the transparent resin used in the present embodiment is not particularly limited so far as the fine particles in the fine particle containing layer can be observed, and the total light transmittance in the visible region is preferably 10% or more, when the layer formed with the transparent resin has similar thickness to the fine particle containing layer.

Incidentally, the total light transmittance is a value measured in accordance with JIS K7105.

Transparent resins are not particularly limited so far as they meet the above light transmittance, and for example, any one of light curable resins, heat curable resins, and thermoplastic resins can be used. Among them, curable resins such as light curable resins and heat curable resins are preferred, and particularly light curable resins are preferred. For example, as illustrated in FIGS. 17, 18, and 20, when the fine particle containing layer 32 is formed on the substrate 35, use of light curable resins allows use of substrates with low heat resistance, thereby enabling to widen options in application. Also, productivity of anti-counterfeiting sheets can be increased.

Transparent resins may be a resin obtained by solidifying the transparent resin composition described in the section of "C. Anti-counterfeiting ink".

The content of the fine particles in the fine particle containing layer is not particularly limited so far as authenticity with the fine particles can be judged when the anti-counterfeiting sheet of the present embodiment is used for the anti-counterfeiting medium, and preferably at least one or more fine particles per $cm^2$ of the fine particle containing layer are contained.

Also, when the fine particle containing layer is formed on a substrate, the fine particle containing layer may be formed in a whole area of the substrate or in a patterned form. When the patterned form of the fine particle containing layer expresses a given meaning, the fine particle can be used for hidden information, thereby increasing the anti-counterfeiting effects.

The film thickness of the fine particle containing layer is not particularly limited so far as authenticity can be judged with the fine particles when the anti-counterfeiting sheet of the present embodiment is used for the anti-counterfeiting medium, and appropriately selected depending on factors such as the layer constitution of the anti-counterfeiting sheet of the present embodiment and types of transparent resins contained in the fine particle containing layer. For example, as illustrated in FIGS. 17, 18, and 20, when the fine particle containing layer 32 is formed on the substrate 35, the film thickness of the fine particle containing layer may be relatively thin. On one hand, as exemplified in FIG. 15, when the fine particle containing layer 32 is formed alone, the film thickness of the fine particle containing layer is relatively thick from the point of view of self-supportiveness. Also, when the transparent resin contained in the fine particle containing layer is a curable resin, the film thickness of the fine particle containing layer is relatively thin from the point of view of preventing cracking.

Specifically, the film thickness of the fine particle containing layer can be adjusted to the range of about 0.1 µm about to 500 µm, and preferably in the range of 1 µm to 100 µm.

A method of forming the fine particle containing layer includes, for example, a method of applying the anti-counterfeiting ink described above to solidify. For example, as illustrated in FIGS. 17, 18, and 20, when the fine particle containing layer 32 is formed on the substrate 35, the anti-counterfeiting ink is applied to the substrate and solidified to form the fine particle containing layer. Also, as exemplified in FIG. 15, when the fine particle containing layer 32 is formed alone, the anti-counterfeiting ink is applied to the substrate and solidified, followed by peeling the fine particle containing layer from the substrate, yielding the fine particle containing layer alone. In this case, there is no preference of the substrate with or without light transmission, and the substrate includes, for example, a glass substrate and a resin substrate.

Any method can be used as a method of coating the anti-counterfeiting ink.

Also, a method of solidifying the anti-counterfeiting ink is appropriately selected depending on the type of transparent resins. In the case of curable resins, a curing method by light and heat is used. In the case of thermoplastic resins, a cooling method is used.

(2) Substrate

In the present embodiment, as exemplified in FIGS. 17, 18, and 20, the fine particle containing layer 32 may formed on the substrate 35. This increases the strength of the anti-counterfeiting sheet of the present embodiment, making its handling better. Among them, when a transparent resin contained in the fine particle containing layer is a curable resin, preferably the fine particle containing layer is relatively thin from the point of view of preventing cracking so that preferably the fine particle containing layer is formed on the substrate. Also, as exemplified in FIG. 17, when the substrate 35 is arranged closer to the surface side than the fine particle containing layer 32 when applying the anti-counterfeiting sheet of the present embodiment to the anti-counterfeiting medium, the fine particle containing layer can be protected by the substrate. In the case of the layered constitution exemplified in FIGS. 17 and 20, a transparent substrate is used, whereas in the case of the layered constitution exemplified in FIG. 18, an opaque substrate can be used.

There is no preference of the substrate used in the present embodiment with or without light transmission, and light transmittance is appropriately selected depending on the location of the substrate formed. As exemplified in FIG. 17, when the substrate 35 is arranged closer to the surface side than the fine particle containing layer 32 or as exemplified in FIG. 20, when the substrate 35 is arranged closer to the surface side than the hologram layer 37 when applying the anti-counterfeiting sheet of the present embodiment to the anti-counterfeiting medium, the substrate preferably has light transmission. On one hand, as exemplified in FIG. 18, when the substrate 35 is arranged closer to the back side than the fine particle containing layer 32 when applying the anti-counterfeiting sheet of the present embodiment to the anti-counterfeiting medium, there is no preference of the substrate with or without light transmission.

When the base material has light transmission, its transmittance is not particularly limited so far as the fine particles in the fine particle containing layer can be observed, and the total light transmittance in the visible region is preferably 10% or higher.

Also, the substrate preferably has flexibility. This makes the anti-counterfeiting sheet of the present embodiment applicable to various forms of anti-counterfeiting mediums.

Ordinary resin substrates can be used as such a substrate. Resin substrates include, for example, polyethylene terephthalate, polyvinyl chloride, polycarbonate, polypropylene, polyethylene, polystyrene, polyarylate, triacetyl cellulose, diacetyl cellulose, polymethyl methacrylate, polyimide, and polyamide.

Also, the surface of the substrate is preferably treated for easier adhesion to increase adhesion to the fine particle containing layer. Easy-adhesion treatment is not particularly limited so far as the treatment can adhere the substrate to the fine particle containing layer, and includes, for example, physical treatments such as plasma treatment, corona discharge treatment, glow discharge treatment, and flame treatment or chemical treatments using chemicals such as chromic acid, silane coupling agents, and primers.

Among them, chemical treatments using primers are preferred. Primers can be suitably used in either one of treatment during manufacture of the substrate and treatment of the surface of the substrate after manufacture. Commercially available products can be used as a primer treated substrate. Also, a primer adhered to the anti-counterfeiting ink can be used as a primer for treating the surface of the substrate after manufacture.

Thickness of the substrate is appropriately selected depending on factors such as the application and types of the anti-counterfeiting sheet of the present embodiment, and can be in the range of about 1 µm to about 800 µm, and preferably in the range of 10 µm to 50 µm.

(3) Adhesive Layer

In the present embodiment, as exemplified in FIGS. 16 to 20, the adhesive layer 34 may be laminated to the fine particle containing layer 32. This allows adhesion of the anti-counterfeiting sheet of the present embodiment through the adhesive layer.

When the fine particle containing layer is formed on the substrate, the adhesive layer may be laminated to the substrate side or to the fine particle containing layer side. When the hard coat layer described below is formed on the fine particle containing layer, the adhesive layer is arranged on the opposite side to the hard coat layer. Also, when the fine particle containing layer and the hologram layer are laminated, the adhesive layer is arranged on the hologram layer side.

Materials for the adhesive layer are not particularly limited so far as the anti-counterfeiting sheet of the present embodiment can be adhered through the adhesive layer, and for example, any one of thermoplastic type, heat curable type, light curable type, and elastomer type materials can be used and appropriately selected depending on factors such as the application and types of the anti-counterfeiting sheet. When the anti-counterfeiting sheet is used as a transfer foil, the adhesive layer having heat sealability is used.

The film thickness of the adhesive layer is not particularly limited so far as the anti-counterfeiting sheet of the present embodiment can be adhered through the adhesive layer, and for example, can be in the range of about 1 μm to 100 μm.

A publicly known adhesion method can be used as a method of forming the adhesive layer.

(4) Delaminating Layer

In the present embodiment, as exemplified in FIGS. 16 to 20, the adhesive layer 34 and the delaminating layer 33 may be laminated in sequence to the fine particle containing layer 32. Lamination of the adhesive layer and the delaminating layer makes easier handling of the anti-counterfeiting sheet of the present embodiment.

When the anti-counterfeiting sheet of the present embodiment is applied to the anti-counterfeiting medium, the delaminating layer is peeled off before use.

The delaminating layer is not particularly limited so far as the delaminating layer has peelability, and for example, an ordinary resin substrate can be used.

(5) Hard Coat Layer

In the present embodiment, as exemplified in FIGS. 18 and 20, the hard coat layer 36 may be formed on the fine particle containing layer 32. The hard coat layer can protect the fine particle containing layer.

When the anti-counterfeiting sheet of the present embodiment is applied to the anti-counterfeiting medium, as exemplified in FIGS. 18 and 20, the hard coat layer 36 is arranged closer to the surface side than the fine particle containing layer 32.

The hard coat layer has light transmission. Light transmittance of the hard coat layer is not particularly limited so far as the fine particles in the fine particle containing layer can be observed, and the total light transmittance in the visible region is preferably 10% or more, and among them, more preferably 50% or more, particularly preferably 80% or more.

Materials of the hard coat layer are not particularly limited so far as they meet the above light transmittance and can protect the fine particle containing layer, and for example, light curable resins can be used.

The film thickness of the hard coat layer is not particularly limited so far as the fine particle containing layer can be protected, and for example, can be in the range of about 1 μm to about 100 μm.

A publicly known method can be used as a method of forming the hard coat layer.

(6) Hologram layer

In the present embodiment, as exemplified in FIGS. 19 and 20, the hologram layer 37 may be laminated to the fine particle containing layer 32. The hologram layer can increase the anti-counterfeiting effects.

The type of the hologram layer is not particularly limited, and relief holograms and volume holograms can be used for the hologram layer. The relief hologram layer is good in productivity, whereas the volume hologram layer is good in anti-counterfeiting effects.

Publicly known holograms can be used as a hologram layer.

When the anti-counterfeiting sheet of the present embodiment is applied to the anti-counterfeiting medium, as illustrated in FIGS. 19 and 20, the hologram layer 37 is arranged closer to the back side than the fine particle containing layer 32. This can utilize the fine particle containing layer as a protective layer of the hologram layer.

(7) Anti-Counterfeiting Sheet

Configuration of the anti-counterfeiting sheet of the present embodiment may be in a form of sheets or lengthy form.

Also, the shape of the anti-counterfeiting sheet of the present embodiment is not particularly limited, and can be any shape such as rectangles, polygons, circles, eclipses, and other. When the shape of the anti-counterfeiting sheet of the present embodiment is a shape of expressing a given meaning, fine particles or a particle group can be used as hidden information.

Figure 21:
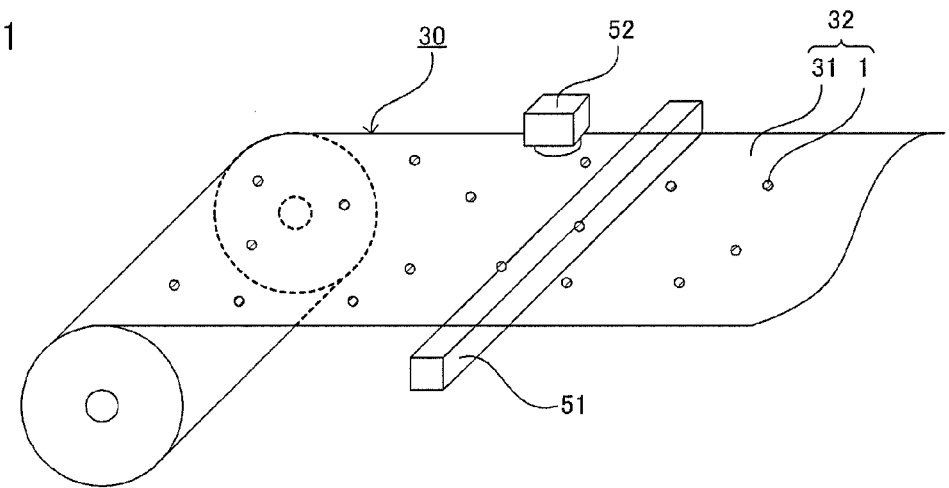
FIG. 21 is a schematic view illustrating an example of an inspection method for the anti-counterfeiting sheet of the present invention.

As illustrated in FIG. 21, a method of inspecting the anti-counterfeiting sheet of the present embodiment includes, for example, a method in which an anti-counterfeiting sheet 30 is irradiated with an LED light source 51 to capture an image with a camera (line sensor camera) 52. In FIG. 21, the LED light source 51 is arranged in the opposite side to the camera 52 with respect to the anti-counterfeiting sheet 30 for observing transmitted light, but while not illustrated, the LED light source may be arranged on the same side as the camera with respect to the anti-counterfeiting sheet for observing reflected light.

An inspection equipment of the anti-counterfeiting sheet can map the location of the fine particles to store map data for checking.

When the area where the fine particles are not contained in the fine particle containing layer is found in inspection, the area where the fine particles are not contained in the fine particle containing layer may be marked using a laser marking machine to exclude them when the anti-counterfeiting sheet is converted to a given shape.

The anti-counterfeiting sheet of the present embodiment can be used as a label as it is or as a transfer foil. Also, when the anti-counterfeiting sheet has a hologram layer, it can be used as a hologram label or a hologram transfer foil. Further, the anti-counterfeiting sheet can be used as a laminate film for the anti-counterfeiting medium.

Since the anti-counterfeiting sheet itself can have light transmission, it can be applied to various anti-counterfeiting mediums.

Further, when the anti-counterfeiting sheet of the present embodiment is applied to the anti-counterfeiting medium, the anti-counterfeiting sheet may be fixed to the surface of the anti-counterfeiting medium, and when the anti-counterfeiting medium is constituted with multiple layers, the anti-counterfeiting sheet may be embedded inside the anti-counterfeiting medium, and when the anti-counterfeiting medium is constituted with a paper, the anti-counterfeiting sheet may be cut into a narrow strip to add in papermaking. When the anti-counterfeiting sheet is fixed to the surface of the anti-counterfeiting medium, the anti-counterfeiting sheet is adhered as it is or transferred using a process with a transfer foil. A transfer method includes a thermal transfer method.

Incidentally, since the anti-counterfeiting medium will be described in the section of "F. Anti-counterfeiting medium" described below, its description is herein omitted.

2. Second Embodiment

The anti-counterfeiting sheet of the present embodiment is a sheet comprising a base part and an identification part formed on the surface of the base part and having the concave and convex shape provided with at least either one of the convex portion and the concave portion having an identification information group including multiple types of identification information identifiable by magnification, characterized in that the identification information group includes first identification information and second identification information which cannot be identified by any magnifying power capable of identifying the first identification information.

The anti-counterfeiting sheet of the present invention has two aspects. Hereinafter, each aspect will be separately described.

(1) First Aspect

The anti-counterfeiting sheet of the present aspect is a sheet comprising a base part and an identification part formed on the surface of the base part and having the concave and convex shape provided with at least either one of the convex portion and the concave portion having an identification information group including multiple types of identification information identifiable by magnification, characterized in that the identification information group includes first identification information and second identification information which cannot be identified by any magnifying power capable of identifying the first identification information.

The anti-counterfeiting sheet of the present aspect will be described with reference to the drawings.

Figure 22A:
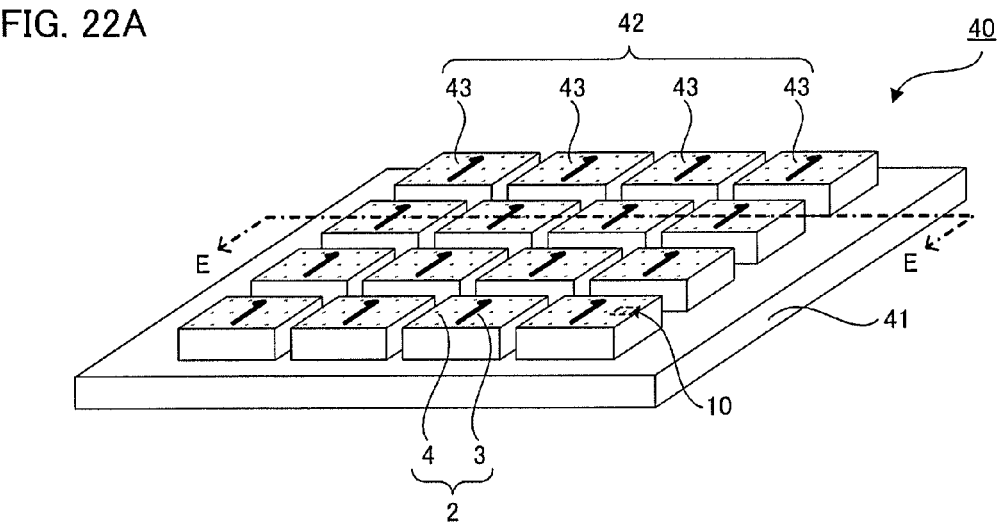
FIGS. 22A to 22C are a schematic view, an enlarged view, and a sectional view illustrating another example of the anti-counterfeiting sheet of the present invention.
Figure 22B:
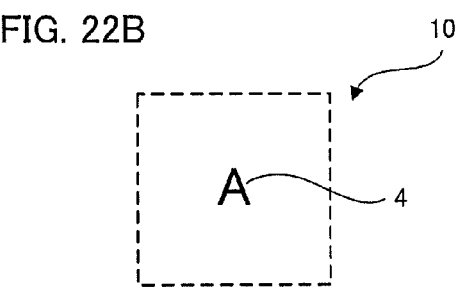
Figure 22C:
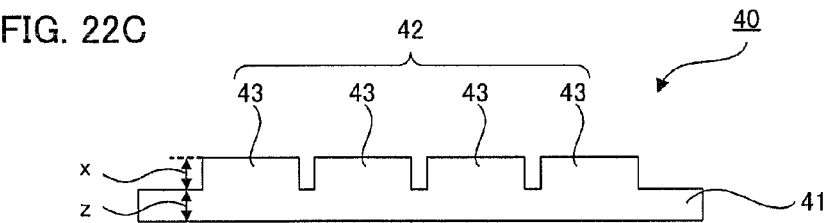

FIG. 22A is a schematic perspective view illustrating an example of the anti-counterfeiting sheet of the present aspect, FIG. 22B is an enlarged view of a boxed area 10 illustrated with a dotted line in FIG. 22A, and FIG. 22C is a sectional view along the E-E line in FIG. 22A. As illustrated in FIGS. 22A to 22C, an anti-counterfeiting sheet 40 comprises a base part 41 and an identification part 42 formed on the base part 41 and having multiple concave and convex shapes provided with convex portions 43. Each of the convex portions 43 has an identification information group 2 including first identification information 3 (numeral "1") and second identification information 4 (letter "A") identifiable by magnification. The second identification information 4 (letter "A") is smaller than the first identification information 3 (numeral "1") and cannot be identified at any magnifying power capable of identifying the first identification information 3 (numeral "1").

Figure 23A:
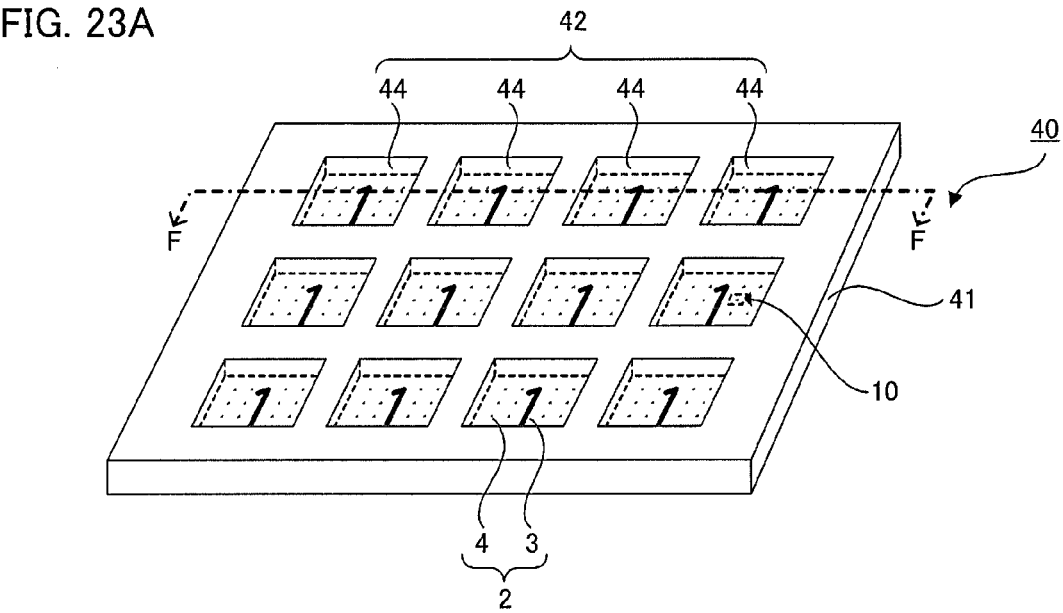
FIGS. 23A to 23C are a schematic view, an enlarged view, and a sectional view illustrating another example of the anti-counterfeiting sheet of the present invention.
Figure 23B:
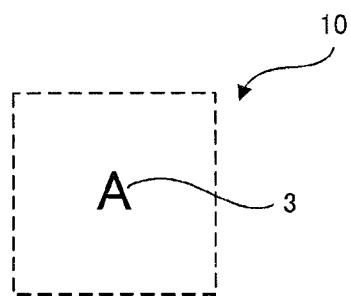
Figure 23C:
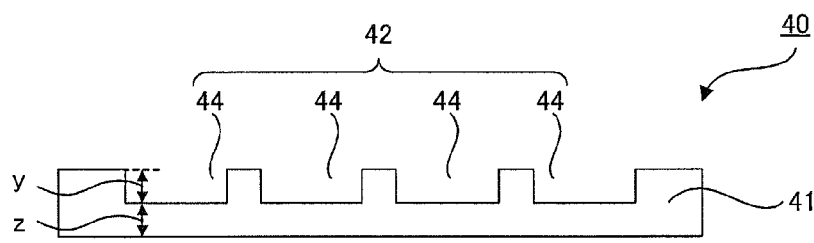

FIG. 23A is a schematic perspective view illustrating another example of the anti-counterfeiting sheet of the present aspect, FIG. 23B is an enlarged view of a boxed area 10 illustrated with a dotted line in FIG. 23A, and FIG. 23C is a sectional view along the F-F line in FIG. 23A. As illustrate in FIGS. 23A to 23C, an anti-counterfeiting sheet 40 comprises a base part 41 and an identification part 42 formed on the base part 41 and having multiple concave and convex shapes provided with concave portions 44. Each of the concave portions 44 has an identification information group 2 including first identification information 3 (numeral "1") and second identification information 4 (letter "A") identifiable by magnification. The second identification information 4 (letter "A") is smaller than the first identification information 3 (numeral "1") and cannot be identified at any magnifying power capable of identifying the first identification information 3 (numeral "1").

Figure 24A:
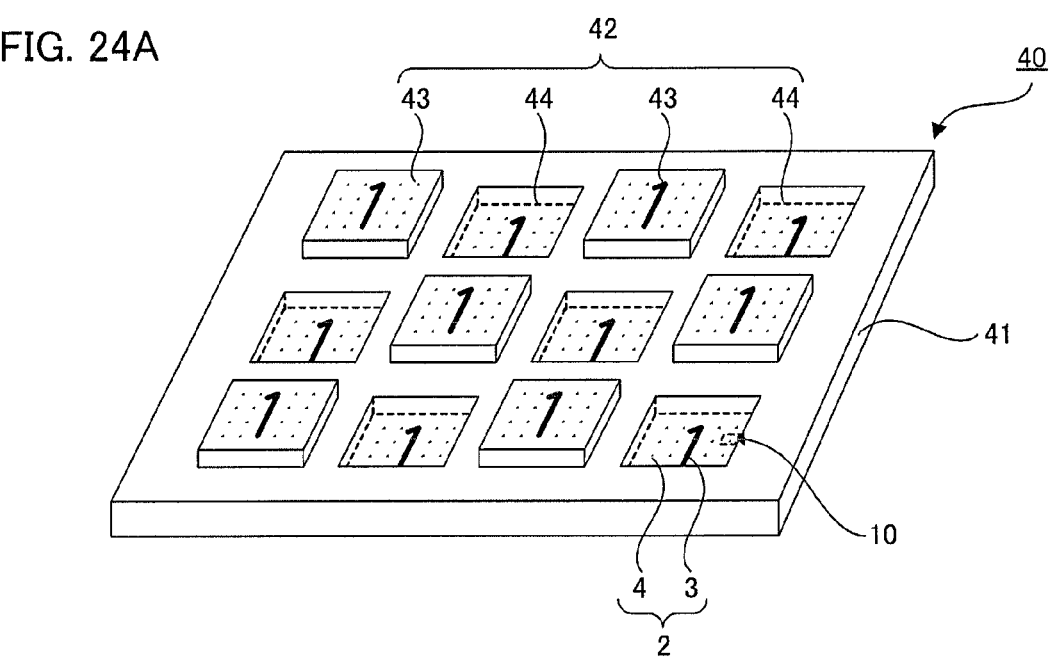
FIGS. 24A and 24B are a schematic view and an enlarged view illustrating another example of the anti-counterfeiting sheet of the present invention.
Figure 24B:
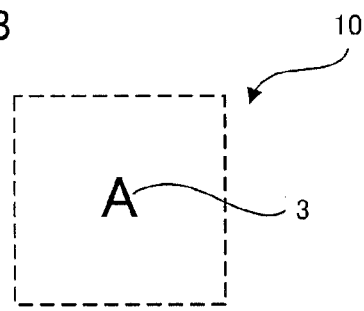

FIG. 24A is a schematic perspective view illustrating another example of the anti-counterfeiting sheet of the present aspect and FIG. 24B is an enlarged view of a boxed area 10 illustrated with a dotted line in FIG. 24A. As illustrated in FIGS. 24A and 24B, an anti-counterfeiting sheet 40 has a base part 41 and an identification part 42 formed on the base part 41 and having multiple concave and convex shapes provided with convex portions 43 or concave portions 44. Each of the convex portions 43 and the concave portions 44 has an identification information group 2 including first identification information 3 (numeral "1") and second identification information 4 (letter "A") identifiable by magnification. The second identification information 4 (letter "A") is smaller than the first identification information 3 (numeral "1") and cannot be identified at any magnifying power capable of identifying the first identification information 3 (numeral "1").

In judgment of authenticity using the anti-counterfeiting sheet 40 exemplified in FIGS. 22A to 22C, FIGS. 23A to 23C, and FIGS. 24A and 24B, first step authentication is firstly performed at low magnifying power by verifying the first identification information 3 (numeral "1") and the second step authentication is next performed at higher magnifying power by verifying the second identification information 4 (letter "A"). In this way, two-step authentication can be installed for judging authenticity. Also, since the second identification information 4 (letter "A") cannot be identified at any magnifying power capable of identifying the first identification information 3 (numeral "1"), the identification level of the second identification information 4 (letter "A") is higher than that of the first identification information 3 (numeral "1").

In this way, in the present aspect, since the identification information group provided in the convex portion and the concave portion includes the first identification information and second identification information, multi-step authentication, the first step authentication for verifying the first identification information and the second step authentication for verifying the second identification information can be performed, thereby enabling to achieve a high level of authentication.

Also, in the present aspect, since the second identification information cannot be identified at any magnifying power capable of identifying the first identification information, it becomes difficult to learn the presence and the detail of the second identification information, and since the authentication level of the second identification information becomes higher than that of the first identification information, excellent anti-counterfeiting effects can be obtained.

Also, in the present aspect, since the first identification information and second identification information can be identified by magnification, authenticity can be easily judged by magnifying the identification part to verify the first identification information and second identification information. Further, since the second identification information cannot be identified at any magnifying power capable of identifying the first identification information, authenticity can be simply judged by magnifying the identification part at any power capable of identifying the first identification information to verify only the first identification information.

Further, in the present aspect, since the identification part has not only the first identification information but also the second identification information which cannot be identified at any magnifying power capable of identifying the first identification information, formation of the identification part is complex making imitation and copy difficult, thereby generating a high level of the anti-counterfeiting effects as well as a deterrent effect.

Also, in the anti-counterfeiting sheet of the first embodiment, control of the location, the direction of fine particles, and the like is difficult potentially making verification of the identification information difficult, but according to the present aspect, since the identification part having the concave and convex shape provided with the convex portion and the concave portion having the identification information is formed on the base part, the number and the location of the convex portion and the concave portion can be determined in advance in the anti-counterfeiting sheet having a certain area, enabling easy verification of identification information and accurate judgment of authenticity within a short period of time. Further, in the present aspect, since the identification part can be applied to the anti-counterfeiting medium while knowing the number and the location of the convex portion and the concave portion in the anti-counterfeiting sheet in advance, the anti-counterfeiting effects can be consistently established as well as a high level of anti-counterfeiting can be obtained.

Also, the anti-counterfeiting sheet of the present aspect has an advantage of easier application to the anti-counterfeiting medium. Further, the anti-counterfeiting sheet of the present aspect is easily laminated to other sheet, increasing value added.

Incidentally, the term "convex portion" means a portion with the convex shape relative to the part not having identification information on the surface side of the anti-counterfeiting sheet on the identification part. Also, the term "concave portion" means a portion with the concave shape relative to the part not having the identification information on the surface of the anti-counterfeiting sheet on the identification part side.

The term "concave and convex shape provided with at least one of the convex portion and the concave portion" means a shape formed with the convex portion or the concave portion.

Also, the term "identification part having the concave and convex shape" is a concept including not only a case in which the identification part has one concave and convex shape but also a case in which it has multiple the concave and convex shapes.

The term "one concave and convex shape" means a shape formed with one convex portion and a shape formed with one concave portion. Also, the term "multiple concave and convex shapes" means a shape formed with multiple convex portions, a shape formed with multiple concave portions, a shape formed with one convex portion and one concave portion, and a shape with multiple convex portions and multiple concave portions.

Hereinafter, each constitution in the anti-counterfeiting sheet of the present aspect will be described.

(a) Identification Part

The identification part in the present aspect is a part formed on the surface of the base part and having the concave and convex shape provided with at least either one of a convex portion or a concave portion having an identification information group including multiple types of identification information identifiable by magnification, in which the identification information group includes first identification information and second identification information which cannot be identified at any magnifying power capable of identifying the first identification information.

Hereinafter, each constitution in the identification part will be described.

(i) Identification Information Group

The identification information group in the present aspect is a group including multiple types of identification information identifiable by magnification, and includes the first identification information and second identification information which cannot be identified at any magnifying power capable of identifying the first identification information.

Incidentally, the identification information group is similar to the group described in the section of "A. Fine particle", and its description is herein omitted.

When the first identification information or other identification information is a shape, it has the outer contour of the convex portion or the concave portion.

Also, when the first identification information or other identification information has a three dimensional shape having the curved surface, the upper surface of the convex portion or the bottom surface of the concave portion has the curved surface.

When the first identification information or second identification information is a mark, a method of forming the mark is not particularly limited so far as a desired mark can be formed in parts of the convex portion or the concave portion. The method of forming the mark includes, for example, a method of forming a mark on parts of the convex portion or the concave portion using a printing method, a method of forming a mark on parts of the convex portion or the concave portion by the forming method, and a method of forming the mark simultaneously when forming the convex portion or the concave portion.

(ii) Concave and Convex Shape

The concave and convex shape in the present aspect is a shape provided with at least one of the convex portion and the concave portion having the identification information group.

The size of the convex portion or the concave portion is not particularly limited so far as the convex portion or the concave portion has the size enough to have the identification information. When the first identification information is a shape, the size of the convex portion or the concave portion has a size identifiable by magnification similarly to the first identification information. Specifically, the size of the convex portion or the concave portion is preferably 300 µm or less, and more preferably 250 µm or less. When the size of the convex portion or the concave portion is too large, it can be visually observed and may likely to lower the anti-counterfeiting effects. Also, the size of the convex portion or the concave portion is preferably observable using a simple magnifying instrument such as a loupe, and specifically preferably 50 µm or more. Observation with a simple magnifying instrument allows easy judgment of authenticity. Also, when the size of the convex portion or the concave portion is too small, it becomes difficult for the convex portion or the concave portion to have desired identification information or its observation with a simple magnifying instrument becomes difficult so that use of a magnifying instrument with a higher power is required and judgment of authenticity potentially becomes complex.

The height of the convex portion or the depth of the concave portion is not particularly limited so far as the convex portion or the concave portion can be formed on the surface of the base part and can have the identification information group, and preferably in the range of 0.1 µm to 500 µm, and among them, more preferably is in the range of 1 µm to 100 µm, and particularly further preferably in the rage of 5 µm to 25 µm. When the height of the convex portion or the depth of the concave portion is in the above range, the convex portion or the concave portion can be easily verified by visual observation with light reflection, enabling easy identification. On one hand, when the height of the convex portion or the depth of the concave portion is too small or too large, it potentially becomes difficult to impart desired identification information to the convex portion or the concave portion.

Incidentally, as exemplified in FIG. 22C, the height of the convex portion indicates the distance "x" between the surface of the portion on which the convex portion 43 of the anti-counterfeiting sheet 40 is not formed and the top of the convex portion 43.

Also, as exemplified in FIG. 23C, the depth of the concave portion indicates the distance "y" between the surface of the portion on which the concave portion 44 of the anti-counterfeiting sheet 40 is not formed and the bottom of the concave portion 44.

The height (x) of the convex portion or the depth (y) of the convex portion can be measured by the destructive or non-destructive inspection method described above.

Also, the size (u) of the convex portion or the concave portion and the height (x) of the convex portion or the depth (y) of the concave portion preferably meets the relationship of $x/u \geq 1/100$ or $y/u \geq 1/100$, respectively, and among them, preferably the relationship of $x/u \geq 30$ or $y/u \geq 30$, further preferably the relationship of $x/u \geq 20$ or $y/u \geq 20$, and particularly preferably the relationship of $x/u \geq 10$ or $y/u \geq 10$. When the ratio of the height (x) of the convex portion or the depth (y) of the concave portion to the size (u) of the convex portion or the concave portion is within the above range, the convex portion or the concave portion can be easily verified by visual observation with light reflection, enabling easy identification. On one hand, when the ratio is too small or too large, it potentially becomes difficult to form the convex portion or the concave portion having desired identification information.

Incidentally, the size (u) of the convex portion or the concave portion is a size in plain view of the convex portion or the concave portion.

The size (u) of the convex portion or the concave portion can be measured by the destructive or non-destructive inspection method described above.

The identification part may have one concave and convex shape or multiple concave and convex shapes. That is, the identification part may have one convex portion or one concave portion, multiple convex portions or multiple concave portions, one convex portion and one concave portion, or multiple convex portions and multiple concave portions. Among them, the identification part preferably has multiple concave and convex shapes. The presence of the multiple concave and convex shapes in the identification part allows addition of various identification information to the anti-counterfeiting sheet of the present aspect, thereby enabling to increase the anti-counterfeiting function.

The number of the convex portion or the concave portion is not particularly limited so far as the number is one or more, and appropriately selected depending on the application of the anti-counterfeiting sheet of the present aspect and the application of the anti-counterfeiting medium to which the anti-counterfeiting sheet of the present aspect is applied, and preferably in the range of 10 to 1,000,000,000, and among them, more preferably in the range of 100 to 1,000,000. When the number of the convex portion or the concave portion does not meet the above range, it potentially takes a longer time to specify the location of the convex portion or the concave portion having an identification information group and to verify the identification information itself.

When the identification part has the multiple concave and convex shapes, the identification information group provided in the convex portion or the concave portion may be identical or different.

When the identification part has two types or more of concave and convex shapes provided with the convex portion or the concave portion with different identification information groups, the ratio of two types or more of the concave and convex shapes may be identical or different.

The arrangement of the convex portion or the concave portion is not particularly limited so far as the arrangement allows recognition of the identification information, and as exemplified in FIGS. 22A and 23A, the convex portion or the concave portion may be regularly arranged or while not illustrated, the convex portion or the concave portion may be irregularly arranged.

(iii) Identification Part

As the arrangement of the identification part, the identification part is formed on the surface of the base part, and for example, may be formed on parts of the anti-counterfeiting sheet or in the whole area of the anti-counterfeiting sheet.

The identification part may be formed on the surface of the base part, and for example, the base part and the identification part may be formed unified or the base part and the identification part may be formed separately, and among them, the base part and the identification part are preferably formed unified. This allows use of a simple method of preparing the anti-counterfeiting sheet of the present aspect.

The size of the whole identification part may be a visibly observable size or a size observable by magnification, and is appropriately selected depending on the application of the anti-counterfeiting sheet of the present aspect.

The identification part may be colorless or colored and is appropriately selected depending on materials for the identification part.

Also, there is no preference of the identification part with or without light transmission, and its light transmittance is appropriately selected depending on materials for the identification part.

Materials for the identification part are not particularly limited so far as they can form the identification part having the concave and convex shape provided with at least one of the convex portion and the concave portion having the identification information group, and generally resin materials are used.

Incidentally, since resin materials are similar to those described in the section of "A. Fine particle", its description is herein omitted.

Also, the identification part can contain in addition to the resin material functional materials such as ultraviolet luminescent materials, infrared luminescent materials, infrared reflection materials, infrared absorption materials, quantum dot materials, magnetic materials, and colored materials.

Incidentally, since functional materials are similar to those described in the section of "A. Fine particle", its description is herein omitted.

A method of forming the identification part is not particularly limited so far as the identification part can be formed on the surface of the base part, and includes, for example, a method of forming the concave and convex shape constituting the identification part on the surface of the resin layer using an original plate having the shape engaged with the concave and convex shape constituting the identification part, a method of applying a machining process to the surface of the resin layer, and a method of forming the concave and convex shape constituting the identification part by light exposure of the photoreactive resin layer for development using photolithography.

(b) Base Part

The base part of the present aspect is a part in which the identification part is formed on its surface.

The thickness of the base part is not particularly limited so far as the identification part can be formed on the surface of the base part and the anti-counterfeiting sheet of the present aspect can be used for desired anti-counterfeiting mediums, and is specifically in the range of 1 μm to 800 μm, and among them, preferably in the range of 10 μm to 50 μm. When the thickness of the base part does not meet the above range of the thickness, it becomes difficult to form the identification part having the concave portion, and when the identification part having the convex portion is formed, it becomes difficult to have sufficient self-supportiveness. Also, when the thickness of the base part exceeds the above range of the thickness, the thickness of the anti-counterfeiting sheet of the present aspect becomes thicker, potentially making difficult fabrication of the anti-counterfeiting sheet of the present aspect. Also, the anti-counterfeiting sheet of the present aspect potentially does not meet standards of the anti-counterfeiting medium to which the anti-counterfeiting sheet of the present aspect is applied.

Incidentally, as exemplified in FIGS. 22C and 23C, the thickness of the base part indicates thickness "z" of the portion in which the identification part 42 of the anti-counterfeiting sheet 40 is not formed.

The thickness of the base part can be measured with the destructive or non-destructive inspection method described above.

When the identification part has the concave and convex shape provided with the convex portion, the thickness of the whole anti-counterfeiting sheet which is generally a sum of the height of the convex portion and the thickness of the base part and the height of the convex portion are measured individually for calculating the difference between the thickness of the whole anti-counterfeiting sheet and the height of the convex portion to determine the thickness of the base part.

The base part may be colorless or colored and is appropriately selected depending on materials for the base part.

Also, there is no preference of the base part with or without light transmission, and its light transmittance is appropriately selected depending on materials for the base part.

Incidentally, materials for the base part are similar to those for the identification part, and its description is herein omitted.

(c) Other Constituent Materials

The anti-counterfeiting sheet of the present aspect is not particularly limited so far it has the base part and the identification part, and may have other constituent materials as needed. Hereinafter, other constituent materials will be described.

(i) Metal Layer

In the present aspect, a metal layer may be formed on the identification part. Formation of the metal layer on the identification part makes easier visual verification of the identification information in the identification part by light reflection, making easier judgment of authenticity as well as increasing the anti-counterfeiting effects. In particular, since a hard coat layer is formed using resins when forming the hard coat layer on the identification part as described below, difference of the refractive indices between the identification part and the hard coat layer is small making it difficult to see the interface between the identification part and the hard coat layer, generating a problem of difficult visual verification of the identification information provided in the convex portion or the concave portion, but formation of the metal layer on the identification part allows increase of the visibility of identification information.

A method of forming the metal layer includes, for example, a vapor deposition method, a plating method, and a sputtering method.

Incidentally, materials, thickness and other factors of the metal layer are similar to those described in the section of "A. Fine particle", and its description is herein omitted.

(ii) Adhesive Layer

An adhesive layer may be formed on at least one surface of the anti-counterfeiting sheet of the present aspect.

An adhesive layer may be formed on at least one surface of the anti-counterfeiting sheet of the present aspect, and for example, may be formed on the identification part side surface of the anti-counterfeiting sheet of the present aspect, or on the base part side surface of the anti-counterfeiting sheet of the present aspect, or on both sides of the anti-counterfeiting sheet of the present aspect.

Incidentally, the adhesive layer can be similar to one described in the section of the anti-counterfeiting sheet of the first embodiment, and its description is herein omitted.

(iii) Delaminating Layer

When the anti-counterfeiting sheet of the present aspect has the adhesive layer, a delaminating layer may be formed on the adhesive layer.

Incidentally, the delaminating layer can be similar to one described in the section of the anti-counterfeiting sheet of the first embodiment, and its description is herein omitted.

(iv) Substrate

In the present aspect, the base part and the identification part may be formed on a substrate.

Incidentally, the substrate can be similar to one described in the section of the anti-counterfeiting sheet of the first embodiment, and its description is herein omitted.

(v) Hard Coat Layer

In the present aspect, the hard coat layer may be formed on the identification part.

Incidentally, the hard coat layer can be similar to one described in the section of the anti-counterfeiting sheet of the first embodiment, and its description is herein omitted.

(vi) Hologram Layer

A hologram layer may be laminated to the base part side surface of the anti-counterfeiting sheet of the present aspect.

Incidentally, the hologram layer can be similar to one described in the section of the anti-counterfeiting sheet of the first embodiment, and its description is herein omitted.

(d) Anti-Counterfeiting Sheet

Configuration, shape, use, and the like of the anti-counterfeiting sheet can be similar to those in the first embodiment, and its description is herein omitted.

(2) Second Aspect

The anti-counterfeiting sheet of the present aspect comprises a base part and an identification part formed on the surface of the base part and having multiple concave and convex shapes provided with at least either one of the convex portion or the concave portion having identification information identifiable by magnification, characterized in that the identification part has common identification information common in the convex portion or the concave portion in all of the concave and convex shapes constituting the identification part and non-common identification information different between the convex portion or the concave portion in one concave and convex shape and the convex portion or the concave portion in other concave and convex shape constituting the identification part, and at least parts of the concave and convex shapes are concave and convex shapes provided with at least either one of the convex portion or the concave portion having an identification information group including multiple types of identification information identifiable by magnification, the identification information group includes first identification information and second identification information which cannot be identified at any magnifying power capable of identifying the first identification information, and among the first identification information and the second identification information, one information is used as the common identification information and the other as the non-common identification information.

The anti-counterfeiting sheet of the present aspect will be described with reference to the drawings.

Figure 25A:
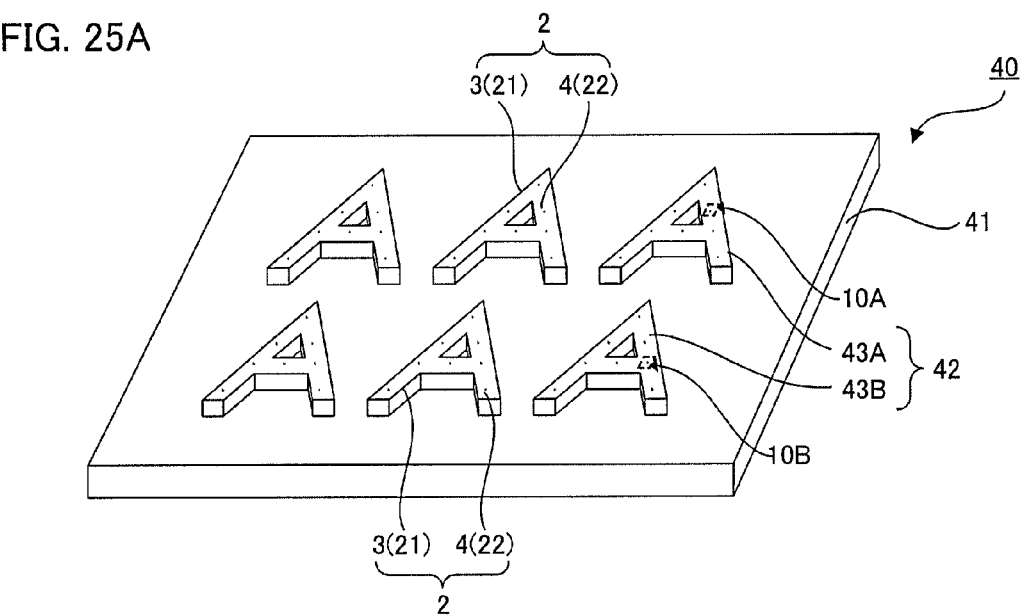
FIGS. 25A and 25B are a schematic view and an enlarged view illustrating another example of the anti-counterfeiting sheet of the present invention.
Figure 25B:
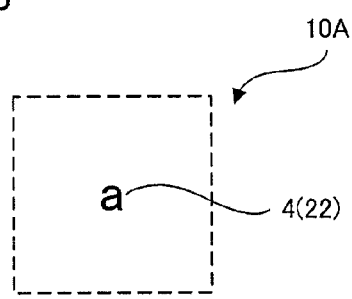
Figure 25C:
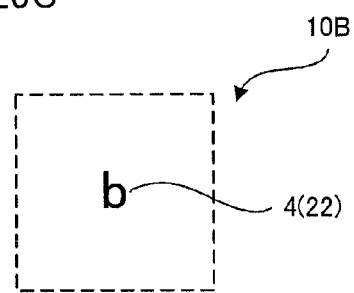

FIG. 25A is a schematic perspective view illustrating an example of the anti-counterfeiting sheet of the present aspect, FIG. 25B is an enlarged view of a boxed area 10A illustrated with a dotted line in FIG. 25A, and FIG. 25C is an enlarged view of a boxed area 10B illustrated with a dotted line in FIG. 25A. As illustrated in FIGS. 25A to 25C, an anti-counterfeiting sheet 40 has a base part 41 and an identification part 42 formed on the base part 41 and having multiple concave and convex shapes provided with convex portions 43A and 43B.

Each convex portion 43A has an identification information group 2 including first identification information 3 (letter "A") and second identification information 4 (letter "a") identifiable by magnification. The second identification information 4 (letter "a") is smaller than the first identification information 3 (letter "A") and cannot be identified at any magnifying power capable of identifying the first identification information 3 (letter "A").

Each convex portion 43B has the identification information group 2 including first identification information 3 (letter "A") and second identification information 4 (letter "b") identifiable by magnification. The second identification information 4 (letter "b") is smaller than the first identification information 3 (letter "A") and cannot be identified at any magnifying power capable of identifying the first identification information 3 (letter "A").

As exemplified in FIGS. 25A to 25C, the first identification information 3 (letter "A") is common in the convex portions 43A and 43B and the common identification information 21 and the second identification information 4 (letters "a" and "b") is different and non-common identification information 22.

In judgment of authenticity using the anti-counterfeiting sheet 40 exemplified in FIGS. 25A to 25C, first step authentication is firstly performed at low magnifying power to verify that the identification part 42 has the common identification information 21 of the letter "A" which is the first identification information 3 in the convex portions 43A and 43B. Next, second step authentication is performed at higher magnifying power to verify that the identification part 42 has the non-common identification information 22 of the letters "a" and "b" as the second identification information 4 which cannot be identified at any magnifying power capable of identifying the first identification information 3 in the convex portions 43A and 43B. In this way, two-step authentication can be installed for judging authenticity.

Since the second identification information 4 cannot be identified at any magnifying power capable of identifying the first identification information 3, the identification level of the second identification information 4 is higher than that of the first identification information 3. Also, since the second identification information 4 is used as the non-common identification information 22 and the non-common identification information 22 is information different between the convex portions 43A and 43B, the verification level of the non-common identification information 22 becomes higher.

In the present aspect, since the identification part has the common identification information common in the convex portion or the concave portion in all of the concave and convex shapes and the non-common identification information different between the convex portion or the concave portion in one concave and convex shape and the convex portion or the concave portion in other concave and convex shape, a higher level of the multi-step verification, verification of the common identification information and verification of the non-common identification, can be performed enabling to achieve a high level of authentication regarding the multiple concave and convex shapes constituting the identification part.

Also, in the present aspect, since the second identification information cannot be identified at any magnifying power capable of identifying the first identification information, it becomes difficult to learn the presence and the detail of the second identification information, making the authentication level of the second identification information higher than the first identification information. Also, since the non-common identification is different between the convex portion or the concave portion with one concave and convex shape and the convex portion or the concave portion with other concave and convex shape, the authentication level of the non-common identification becomes higher. Since either one of the first identification information and second identification information is used as the common identification information and the other as the non-common identification information, excellent anti-counterfeiting effects can be obtained.

Also, in the present aspect, since the first identification information and second identification information can be identified by magnification and among the first identification information and second identification information, one information is the common identification information and the other is the non-common identification information, authenticity can be easily judged by magnifying the fine particles to verify the common identification information and the non-common identification information.

Further, since the second identification information cannot be identified at any magnifying power capable of identifying the first identification information and the first identification information is the common identification information or the non-common identification information, genuineness can be assured by magnifying the fine particles at any power capable of identifying the first identification information to verify only the first identification information and verifying only either one of the common identification information and non-common identification information, thereby enabling to judge authenticity simply.

Further, in the present aspect, since the identification part has not only the first identification information but also the second identification information which cannot be identified at any magnifying power capable of identifying the first identification information, formation of the identification part is complex making imitation and copy difficult, thereby enabling to achieve a high level of the anti-counterfeiting effects as well as a deterrent effect.

Also, in the anti-counterfeiting sheet of the first embodiment, control of the location, the direction of fine particles, and the like is difficult potentially making verification of the identification information difficult, but according to the present aspect, since the identification part having the concave and convex shape provided with the convex portion or the concave portion having identification information is formed on the base part, the number and the location of the convex portion or the concave portion can be determined in advance in the anti-counterfeiting sheet having a certain area, enabling easy verification of the identification information and accurate judgment of authenticity within a short period of time. Further, in the present aspect, since the anti-counterfeiting sheet can be applied to the anti-counterfeiting medium while knowing the number and the location of the convex portion or the concave portion in the anti-counterfeiting sheet in advance, the anti-counterfeiting effects can be consistently established as well as a high level of anti-counterfeiting can be obtained.

Also, the anti-counterfeiting sheet of the present aspect has an advantage of easier application to the anti-counterfeiting medium. Further, the anti-counterfeiting sheet of the present aspect is easily laminated to other sheet, thereby increasing value added.

Hereinafter, each constitution in the anti-counterfeiting sheet of the present aspect will be described.

(a) Identification Part

The identification part in the present aspect is a part formed on the surface of the base part and having multiple concave and convex shapes provided with at least either one of the convex portion or the concave portion having identification information identifiable by magnification. The identification part has common identification information common in the convex portion or the concave portion in all of the concave and convex shapes constituting the identification part and non-common identification information different between the convex portion or the concave portion in one concave and convex shape and the convex portion or the concave portion in other concave and convex shape constituting the identification part. Also, at least parts of the concave and convex shapes are shapes provided with at least either one of the convex portion or the concave portion having the identification information group including multiple types of identification information identifiable by magnification, in which the identification information group includes first identification information and second identification information which cannot be identified at any magnifying power capable of identifying the first identification information. Among the first identification information and the second identification information, one information is used as the common identification information and the other as the non-common identification information.

Hereinafter, each constitution of the identification part will be described.

(i) Common Identification Information

Common identification information in the present aspect is information common in the convex portion or the concave portion in all of the concave and convex shapes constituting the identification part.

Incidentally, the common identification information is similar to one described in the section of "B. Particle group", and its description is herein omitted.

(ii) Non-Common Identification Information

Non-common identification information in the present aspect is information different between the convex portion or the concave portion with one concave and convex shape constituting the identification part and the convex portion or the concave portion with other concave and convex shape constituting the identification part.

Incidentally, the non-common identification information can be similar to one described in the section of "B. Particle group", and its description is herein omitted.

(iii) Concave and Convex Shape

The concave and convex shape in the present aspect is provided with at least either one of the convex portion or the concave portion having identification information identifiable by magnification, and the identification part has multiple concave and convex shapes. Among the multiple concave and convex shapes, at least parts of them are shapes provided with at least either one of the convex portion or the concave portion having the identification information group including multiple types of identification information identifiable by magnification, and the identification information group includes first identification information and second identification information which cannot be identified at any magnifying power capable of identifying first identification information.

Incidentally, while the concave/convex is a shape provided with at least either one of the convex portion or the concave portion having the identification information group including multiple types of identification information identifiable by magnification, the concave and convex shape including first identification information and second identification information which cannot be identified at any magnifying power capable of identifying the first identification information is similar to one described in the first aspect, and its description is herein omitted.

Among the multiple concave and convex shapes, at least parts of them are shapes provided with at least either one of the convex portion or the concave portion having the identification information group including the first identification information and second identification information. For example, all of the concave and convex shapes may be shapes provided with at least either one of the convex portion or the concave portion having the identification information group including the first identification information and second identification information and the identification part may have only the concave and convex shape provided with at least either one of the convex portion or the concave portion having the identification information group including first identification information and second identification information. Also, for example, parts of the concave and convex shapes may be shapes provided with at least either one of the convex portion or the concave portion having the identification information group including the first identification information and second identification information and the identification part may have the concave and convex shape provided with at least either one of the convex portion or the concave portion having the identification information group including the first identification information and second identification information and other concave and convex shape provided with at least either of the convex portion or the concave portion having the identification information.

Other concave and convex shape provided with at least either of the convex portion or the concave portion having the identification information is not particularly limited so far as the shape has the identification information identifiable by magnification and combination of the concave and convex shape provided with at least either of the convex portion or the concave portion having the identification information group including the first identification information and second identification information with other concave and convex shape provided with at least either one of the convex portion or the concave portion having the identification information allows, among the first identification information and second identification information, use of one information as the common identification information and the other as the non-common identification information.

The identification information provided in the convex portion or the concave portion with other concave and convex shape is not particularly limited so far as information can be identified by magnification, and is similar to the first identification information.

The number of types of the multiple convex and concave shapes constituting the identification part can be two or more.

Incidentally, since the size of the convex portion or the concave portion, the height of the convex portion or the depth of the concave portion, the number of the convex portion or the concave portion, arrangement of the convex portion or the concave portion, and other factors are similar to those in the first aspect, its description is herein omitted.

(iv) Identification Part

Incidentally, since an arrangement of the identification part, the size of whole identification part, materials of the identification part, a method of forming the identification part, and other factors are similar to those in the first aspect, its description is herein omitted.

(b) Base Part

The base part of the present aspect is a base part on which the identification part is formed.

Incidentally, since the base part is similar to one in the first aspect, its description is herein omitted.

(c) Other Constituent Member

The anti-counterfeiting sheet of the present aspect is not particularly limited so far as it has the base part and the identification part, and may have other constituent member as needed.

Incidentally, since the constituent member is similar to one in the first aspect, its description is herein omitted.

(d) Anti-Counterfeiting Sheet

Since configuration, shape, use, and other factors of the anti-counterfeiting sheet are similar to those in the first embodiment, its description is herein omitted.

F. Anti-Counterfeiting Medium

Next, an anti-counterfeiting medium of the present invention are described.

The anti-counterfeiting medium of the present invention comprises the fine particle described above, the particle group described above, and the anti-counterfeiting sheet described above.

Figure 26A:
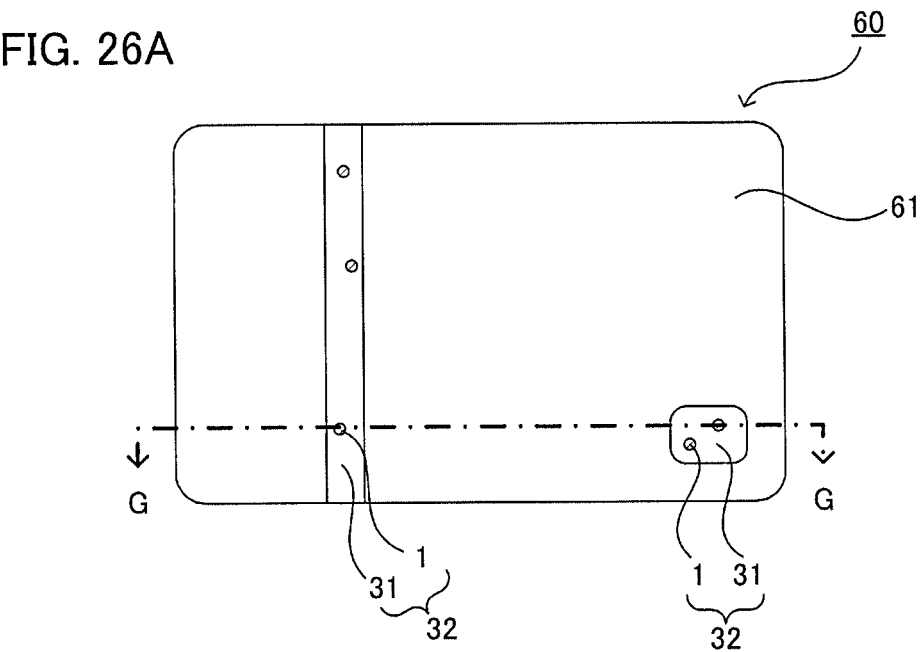
FIGS. 26A and 26B are a top view and a sectional view illustrating an example of the anti-counterfeiting medium of the present invention.
Figure 26B:
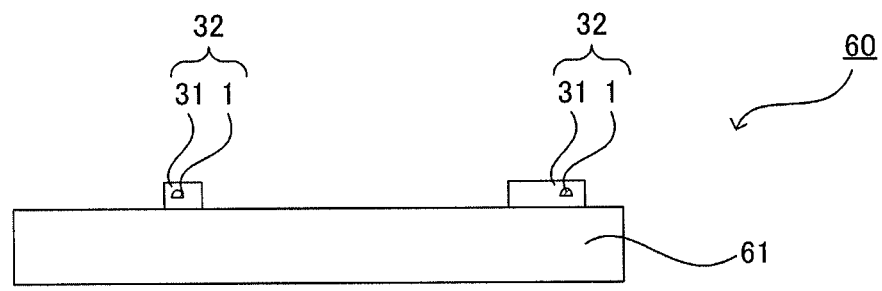

FIGS. 26A and 26B are schematic views illustrating an example of the anti-counterfeiting medium of the present invention, FIG. 26A is a top view, and FIG. 26B is a sectional view along the G-G line in FIG. 26A. In an anti-counterfeiting medium 60 illustrated in FIGS. 26A and 26B, a fine particle containing layer 32 in which the fine particle 1 described above is dispersed in a transparent resin 31 is fixed to the surface of a supporting body 61.

Figure 27A:
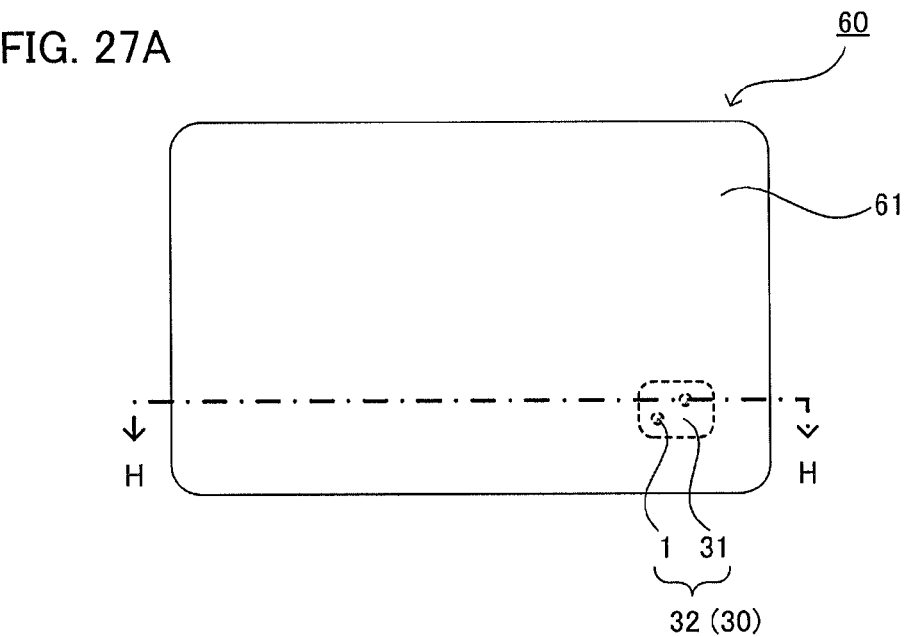
FIGS. 27A to 27C are a top view, a sectional view, and a perspective view illustrating another example of the anti-counterfeiting medium of the present invention.
Figure 27B:
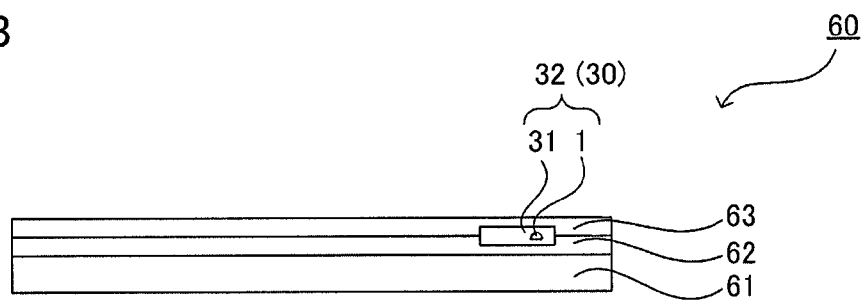
Figure 27C:
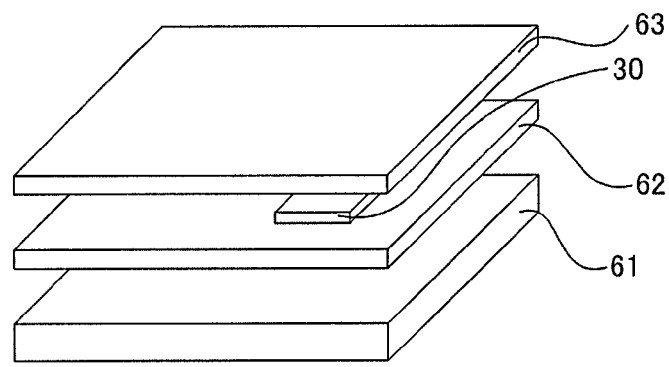

FIGS. 27A to 27C are schematic views illustrating another example of the anti-counterfeiting medium of the present invention, FIG. 27A is a top view, FIG. 27B is a sectional view along the H-H line in FIG. 27A, and FIG. 27C is a perspective view illustrating the layered structure of the anti-counterfeiting medium. In an anti-counterfeiting medium 60 illustrated in FIGS. 27A to 27C, a first resin layer 62, an anti-counterfeiting sheet 30 constituted with a fine particle containing layer 32 in which the fine particle 1 described above is dispersed in a transparent resin 31, and a second resin layer 63 are laminated on a supporting body 61, and an anti-counterfeiting sheet 30 is embedded inside the anti-counterfeiting medium 60. When the anti-counterfeiting sheet is embedded inside the anti-counterfeiting medium, abuse by peeling off the anti-counterfeiting sheet can be prevented.

Since the anti-counterfeiting medium of the present invention comprises the fine particle described above, the particle group described above, or the anti-counterfeiting sheet described above, it is very useful for preventing counterfeit.

Hereinafter, each constituent in the anti-counterfeiting medium of the present invention will be described.

Incidentally, since the fine particles are described in detail in the section of "A. Fine particle", the particle group is described in detail in the section of "B. Particle group", and the anti-counterfeiting sheet is described in detail in the section of "E. Anti-counterfeiting sheet", its description is herein omitted.

When the fine particle or the particle group described above is used, a method of fixing the fine particles to the surface of the supporting body includes use of the anti-counterfeiting ink, the anti-counterfeiting toner, and the anti-counterfeiting sheet described above. When the anti-counterfeiting ink is used, a method includes application of the anti-counterfeiting ink to the surface of the supporting body for solidification. When the anti-counterfeiting toner is used, a method includes transfer of the anti-counterfeiting toner to the surface of the supporting body. When the anti-counterfeiting sheet is used, a method includes a method of firmly fixing the anti-counterfeiting sheet to the surface of the supporting body, a method of laminating the supporting body, the first resin layer, the anti-counterfeiting sheet, and the second resin layer, and a method of cutting the anti-counterfeiting sheet into narrow strips to mix in papermaking when the supporting body is a paper. When the anti-counterfeiting sheet is firmly fixed to the surface of the supporting body, the sheet may be adhered as it is or transferred. Also, a method of laminating the supporting body, the first resin layer, the anti-counterfeiting sheet, and the second resin layer includes, for example, a method of laminating each layer through an adhesive layer and a method of laminating each layer by heat pressing.

The supporting body used in the present invention is appropriately selected depending on the application of the anti-counterfeiting medium of the present invention. There is no preference of the supporting body with or without light transmission. Materials for the supporting body include, for example, glass, resins, metals, and paper.

Also, when the supporting body, the first resin layer, the anti-counterfeiting sheet, and the second resin layer are laminated, there is no preference with or without light transmission. Among them, when a functional layer (for example, image receiving layer, hologram layer) which can record or has any information is formed between the supporting body and the first resin layer, the first resin layer preferably has light transparency. When the first resin layer is light transmittant, its transparency can be adjusted similar to the transparency of the substrate constituting the anti-counterfeiting sheet. For example, an ordinary resin substrate can be used as the first resin layer.

On one hand, the second resin layer is light transmittant. Transparency of the second resin layer can be adjusted similar to the transparency of the substrate constituting the anti-counterfeiting sheet. For example, an ordinary resin substrate can be used as the second resin layer.

Application of the anti-counterfeiting medium of the present invention includes, for example, gold notes, gift cards, credit cards, identification (ID) cards, passports, drive licenses, brand-name goods, automotive parts, precision mechanical equipment parts, home electrical appliances, cosmetics, drugs, foods, supplies for office automation (OA) equipment, sporting goods, CD, DVD, software, tobacco, and liquor.

The present invention is not limited by the above embodiments. The above embodiments are illustrated as examples, and anything having the constituent essentially identical to the technical idea described in the claims in the present invention and achieving the similar operation/working effects is included in the technical scope of the present invention.

EXAMPLES

Hereinafter, the present invention will be specifically described with reference to examples.

The surface of 6 inch silicon wafer was treated with hexamethyldisilazane (HMDS), followed by application of a photoresist type resist (LA900™, manufactured by Tokyo Ohka Kogyo Co., Ltd.) and heat treatment to form a coated film with a thickness of 20 µm.

The coated film formed on the silicon wafer was exposed to light through the pattern on the mask having the concentration gradient corresponding to the pattern of first identification information and second identification information using a semiconductor exposure equipment (NSR-2205i14E2™, manufactured by Nikon Corporation). The exposure wavelength and the amount of light exposure were 365 nm and 800 mJ, respectively.

After light exposure, development and washing, produced on the silicon wafer was an original plate having the pattern (size: 300 μm) corresponding the first identification information and the pattern (size: 15 μm) corresponding to the second identification information with the concave and convex shape of the photoresist. Development was performed for 5 minutes using NMD-3™ (manufactured by Tokyo Ohka Kougyo Co., Ltd.) as a developer, followed by washing with pure water.

An ultraviolet (UV) curable resin was applied to the original plate on which the concave/convex pattern was formed, and a polyethylene terephthalate (PET) film (A4300™, manufactured by Toyobo Co., Ltd.) (thickness: 38 μm) with easy-adhesion treatment was superimposed thereon and irradiated with a UV lamp for semi-curing to release the easy-adhesion treated PET film as well as the UV cured resin from the original plate. After delaminated, the PET film was re-irradiated with a UV lamp for final complete curing.

The above process produced a sheet on which a concave/convex pattern with the first identification information and second identification information was formed on the PET substrate.

REFERENCE SIGNS LIST 1, 1A, 1B, 1C: Fine particle
2: Identification information group
3: First identification information
4: Second identification information
5: Identification information
21: Common identification information
22: Non-common identification information
30: Anti-counterfeiting sheet
31: Transparent resin
32: Fine particle containing layer
33: Delaminating layer
34: Adhesive layer
35: Substrate
36: Hard coat layer
37: Hologram layer
40: Anti-counterfeiting sheet
41: Base part
42: Identification part
43, 43A, 43B: Convex portion
44: Concave portion
60: Anti-counterfeiting medium
61: Supporting body

The invention claimed is:

1. A fine particle comprising an identification information group including multiple types of identification information identifiable by magnification,
wherein the identification information group includes first identification information and second identification information which cannot be identified at any magnifying power capable of identifying the first identification information, and
a size of the identification information is within a rage of 0.4 μm or more and 300 μm or less, a size of the second identification information is 1/10 or less relative to a size of the first identification information, the first identification information is an outer shape of the fine particles, and a particle diameter of the fine particles is 50 μm or more and 300 μm or less.

2. An anti-counterfeiting ink comprising a transparent resin composition and the fine particle according to claim 1 which is dispersed in the transparent resin composition.

3. An anti-counterfeiting toner comprising a resin and the fine particle according to claim 1.

4. An anti-counterfeiting sheet, comprising a fine particle containing layer in which the fine particle according to claim 1 is dispersed in a transparent resin.

5. An anti-counterfeiting medium comprising a supporting body and the anti-counterfeiting sheet according to claim 4.

6. An anti-counterfeiting medium comprising a supporting body and the fine particle according to claim 1.

7. A particle group containing multiple fine particles comprising identification information identifiable by magnification,
wherein the particle group has common identification information common in all of the fine particles contained in the particle group and non-common identification information different between one fine particle and other fine particle contained in the particle group,
at least parts of the fine particles are fine particles comprising identification information group including multiple types of identification information identifiable by magnification,
the identification information group includes first identification information and second identification information which cannot be identified at any magnifying power capable of identifying the first identification information, and
among the first identification information and the second identification information, one information is used as the common identification information and the other as the non-common identification information.

8. The particle group according to claim 7, wherein a size of the second identification information is 1/10 or less relative to a size of the first identification information.

9. An anti-counterfeiting ink comprising a transparent resin composition and the particle group according to claim 7 which is dispersed in the transparent resin composition.

10. An anti-counterfeiting toner comprising a resin and the particle group according to claim 7.

11. An anti-counterfeiting sheet, comprising a fine particle containing layer in which the particle group according to claim 7 is dispersed in a transparent resin.

12. An anti-counterfeiting medium comprising a supporting body and the particle group according to claim 7.

13. An anti-counterfeiting sheet, comprising
a base part and
an identification part formed on a surface of the base part and having a concave and convex shape provided with at least either one of a convex portion or a concave portion having an identification information group including multiple types of identification information identifiable by magnification,
wherein the identification information group includes first identification information and second identification information which cannot be identified at any magnifying power capable of identifying the first identification information,
the convex portion is a portion with a convex shape relative the surface of the base part, and the concave portion is a portion with the concave shape relative to the surface of the base part.

14. The anti-counterfeiting sheet according to claim 13, wherein a size of the second identification information is 1/10 or less relative to a size of the first identification information.

15. An anti-counterfeiting medium comprising a supporting body and the anti-counterfeiting sheet according to claim 13.

16. An anti-counterfeiting sheet, comprising
a base part and
an identification part formed on a surface of the base part and having multiple concave and convex shapes provided with at least either one of a convex portion or a concave portion having identification information identifiable by magnification,
wherein the identification part has common identification information come on in the convex portion or the concave portion in all of the concave and convex shapes constituting the identification part and non-common identification information different between the convex portion or the concave portion in one concave and convex shape and the convex portion or the concave portion in other concave and convex shape constituting the identification part,
at least parts of the concave and convex shapes are concave and convex shapes provided with at least either one of the convex portion or the concave portion having an identification information group including multiple types of identification information identifiable by magnification,
the identification information group includes first identification information and second identification information which cannot be identified at any magnifying power capable of identifying the first identification information, and
among the first identification information and the second identification information, one information is used as the common identification information and the other as the non-common identification information.

17. The anti-counterfeiting sheet according to claim 16, wherein a size of the second identification information is $1/10$ or less relative to a size of the first identification information.

18. An anti-counterfeiting medium comprising supporting body and the anti-counterfeiting sheet according to claim 16.

* * * * *